(12) United States Patent
Wilson

(10) Patent No.: US 10,569,828 B2
(45) Date of Patent: Feb. 25, 2020

(54) PEDAL VEHICLES AND TRANSMISSIONS THEREFOR

(71) Applicant: Michael Thomas Wilson, Missouri City, TX (US)

(72) Inventor: Michael Thomas Wilson, Missouri City, TX (US)

( * ) Notice: Subject to any disclaimer, the term of this patent is extended or adjusted under 35 U.S.C. 154(b) by 210 days.

(21) Appl. No.: 15/828,400

(22) Filed: Nov. 30, 2017

(65) Prior Publication Data

US 2018/0148125 A1 May 31, 2018

Related U.S. Application Data

(60) Provisional application No. 62/428,040, filed on Nov. 30, 2016.

(51) Int. Cl.
*B62M 1/12* (2006.01)
*B62M 9/12* (2006.01)
*B62K 5/05* (2013.01)
*B62M 9/16* (2006.01)
*B62K 3/00* (2006.01)

(52) U.S. Cl.
CPC .............. *B62M 1/12* (2013.01); *B62K 3/005* (2013.01); *B62K 5/05* (2013.01); *B62M 9/12* (2013.01); *B62M 9/16* (2013.01)

(58) Field of Classification Search
CPC . B62M 1/00; B62M 1/12; B62M 1/36; B62M 9/00; B62M 9/04
See application file for complete search history.

(56) References Cited

U.S. PATENT DOCUMENTS

| | | | | |
|---|---|---|---|---|
| 4,674,762 A * | 6/1987 | Nelson | ............. | B62M 1/00 267/273 |
| 4,768,607 A * | 9/1988 | Molina | ............. | F02B 73/00 180/165 |
| 4,826,190 A * | 5/1989 | Hartmann | ............. | B62K 3/005 280/236 |
| 5,577,749 A * | 11/1996 | Ross | ............. | B62M 1/36 280/238 |
| 7,011,323 B1 * | 3/2006 | Sayed | ............. | B62M 9/04 280/260 |
| 2007/0176391 A1 * | 8/2007 | Morowat | ............. | B62M 9/04 280/260 |
| 2007/0290478 A1 * | 12/2007 | Ting | ............. | B62K 5/00 280/260 |
| 2008/0261735 A1 * | 10/2008 | Cappellini | ............. | B62M 9/04 474/78 |

* cited by examiner

*Primary Examiner* — Joseph M Rocca
*Assistant Examiner* — Michael R Stabley
(74) *Attorney, Agent, or Firm* — Conley Rose, P.C.

(57) ABSTRACT

A pedal operated vehicle includes a frame and a drive wheel rotatably coupled to the frame. In addition, the vehicle includes a pedal assembly coupled to the frame and including a pedal sprocket. Further, the vehicle includes a transmission mounted to the frame. The transmission includes an input sprocket mounted to a rotatable first shaft and an output sprocket mounted to a rotatable second shaft. A first chain is disposed about the pedal sprocket and the input sprocket. The output sprocket is configured to drive the rotation of the drive wheel. Moreover, the transmission includes a first plurality of sprockets coupled to the rotatable first shaft and a second plurality of sprockets coupled to the rotatable second shaft. A second chain disposed about one sprocket of the first plurality of sprockets and one sprocket of the second plurality of sprockets.

18 Claims, 17 Drawing Sheets

PEDAL VEHICLES AND TRANSMISSIONS THEREFOR

CROSS-REFERENCE TO RELATED APPLICATIONS

This application claims benefit of U.S. provisional patent application Ser. No. 62/428,040 filed Nov. 30, 2016, and entitled "Combination Row and Pedal Bike and Transmission Therefor," which is hereby incorporated herein by reference in its entirety for all purposes.

STATEMENT REGARDING FEDERALLY SPONSORED RESEARCH OR DEVELOPMENT

Not applicable.

BACKGROUND

This disclosure relates generally to human powered transportation devices. More specifically, this disclosure relates to transmissions for said human powered transportation devices.

Human powered conveyances or vehicles, such as bicycles, tricycles, recumbent cycles (e.g., bicycle, tricycle, etc.) may include one or more power input assemblies that allow the rider to provide motive power to the vehicle. For example, many such human powered vehicles include one or more pedals and/or rowing assemblies that can be manipulated by the rider's feet and/or hands, respectively, to propel the vehicle forward.

BRIEF SUMMARY OF THE DISCLOSURE

Embodiments of pedal operated vehicles are disclosed herein. In one embodiment, a pedal operated vehicle comprising a frame. In addition, the pedal operated vehicle comprises a plurality of wheels rotatably coupled to the frame. The plurality of wheels include a drive wheel. Further, the pedal operated vehicle comprises a pedal assembly coupled to the frame and including a pedal and a pedal sprocket configured to be rotated by the pedal. Further, the pedal operated vehicle comprises a transmission mounted to the frame. The transmission comprises an input sprocket mounted to a rotatable first shaft. The transmission also comprises an output sprocket mounted to a rotatable second shaft. The output sprocket is configured to drive the rotation of the drive wheel. Still further, the transmission comprises a first plurality of sprockets coupled to the rotatable first shaft. Moreover, the transmission comprises a first chain disposed about the pedal sprocket and the input sprocket. The first chain is configured to transfer rotational torque from the pedal sprocket to the input sprocket. In addition, the transmission comprises a second plurality of sprockets coupled to the rotatable second shaft. The transmission also comprises a second chain disposed about one sprocket of the first plurality of sprockets and one sprocket of the second plurality of sprockets.

Embodiments of pedal operated vehicles are disclosed herein. In one embodiment, a pedal operated vehicle comprises a frame. In addition, the pedal operated vehicle comprises a plurality of wheels rotatably coupled to the frame. The plurality of wheels include a drive wheel. Further, the pedal operated vehicle comprises a pedal assembly coupled to the frame and including a pedal. Still further, the pedal operated vehicle comprises a transmission mounted to the frame. The transmission comprises a housing. The transmission also comprises an input sprocket supported by the housing and mounted for rotation about a first axis. The pedal is configured to drive the rotation of the input sprocket. Moreover, the transmission comprises a transfer sprocket supported by the housing and mounted for rotation about the first axis. The input sprocket is configured to drive the rotation of the transfer sprocket. In addition, the transmission comprises a first plurality of sprockets mounted for rotation about a second axis and configured to transfer rotational torque to the drive wheel. The transmission also comprises a chain coupling the transfer sprocket to first plurality of sprockets. The transfer sprocket is configured to drive the rotation of the first plurality of sprockets with the chain. Further, the transmission comprises a gear shifting assembly comprising an actuator configured to bear against an external surface of the chain to move the chain from one sprocket of the first plurality of sprockets to another sprocket of the first plurality of sprockets.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION OF EXEMPLARY EMBODIMENTS

Figure 1A:
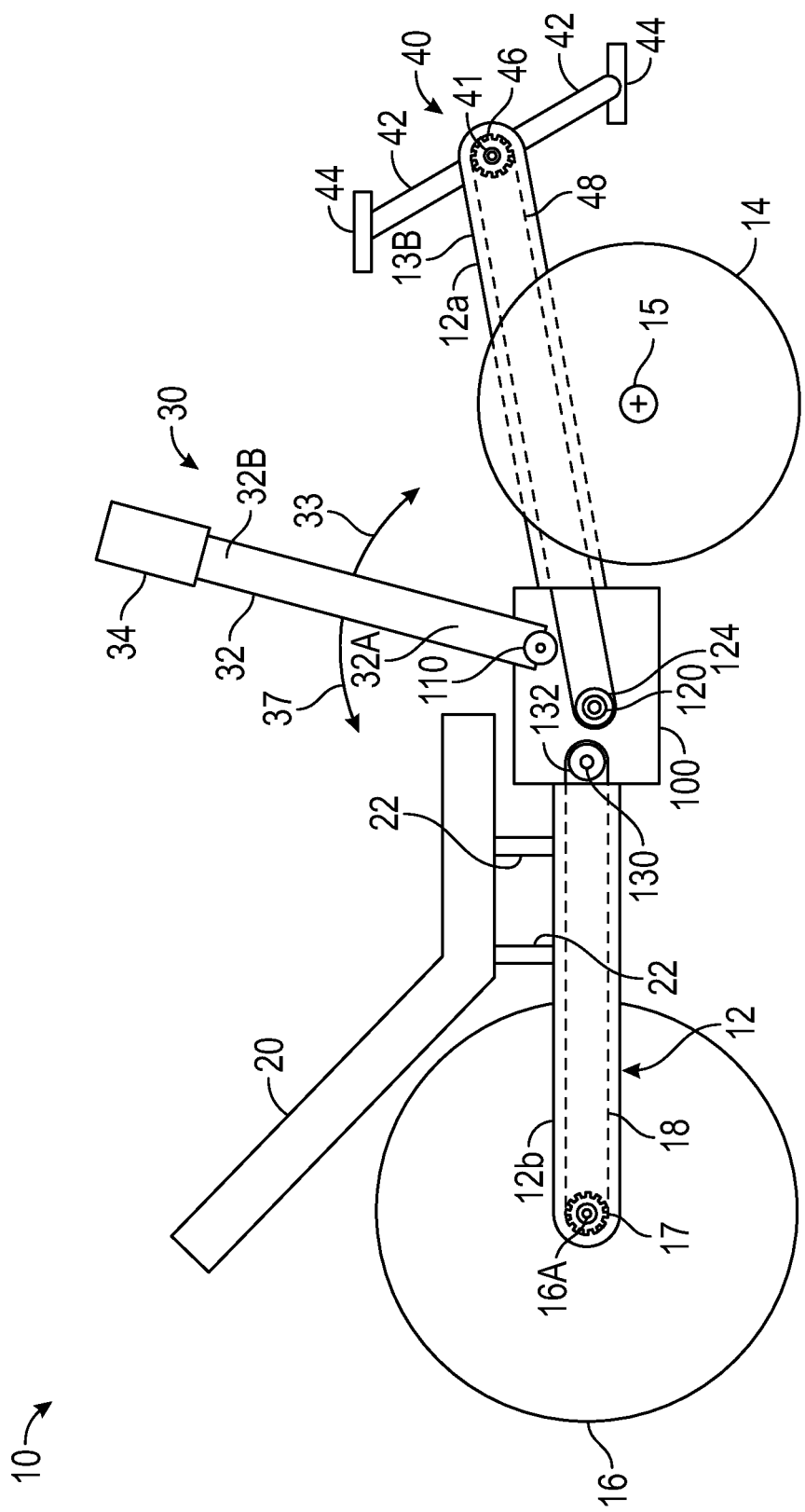
FIG. 1A is a schematic view of an embodiment of a recumbent combination pedal and rowing tricycle including a transmission in accordance with the principals disclosed herein.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. As used herein and unless specified otherwise, the terms "generally, "about," "approximately," "substantially," and the like mean +/−10%. As used herein, including the claims, an axle, whether rotational or non-rotational, may also be referred to as a shaft.

Figure 1B:
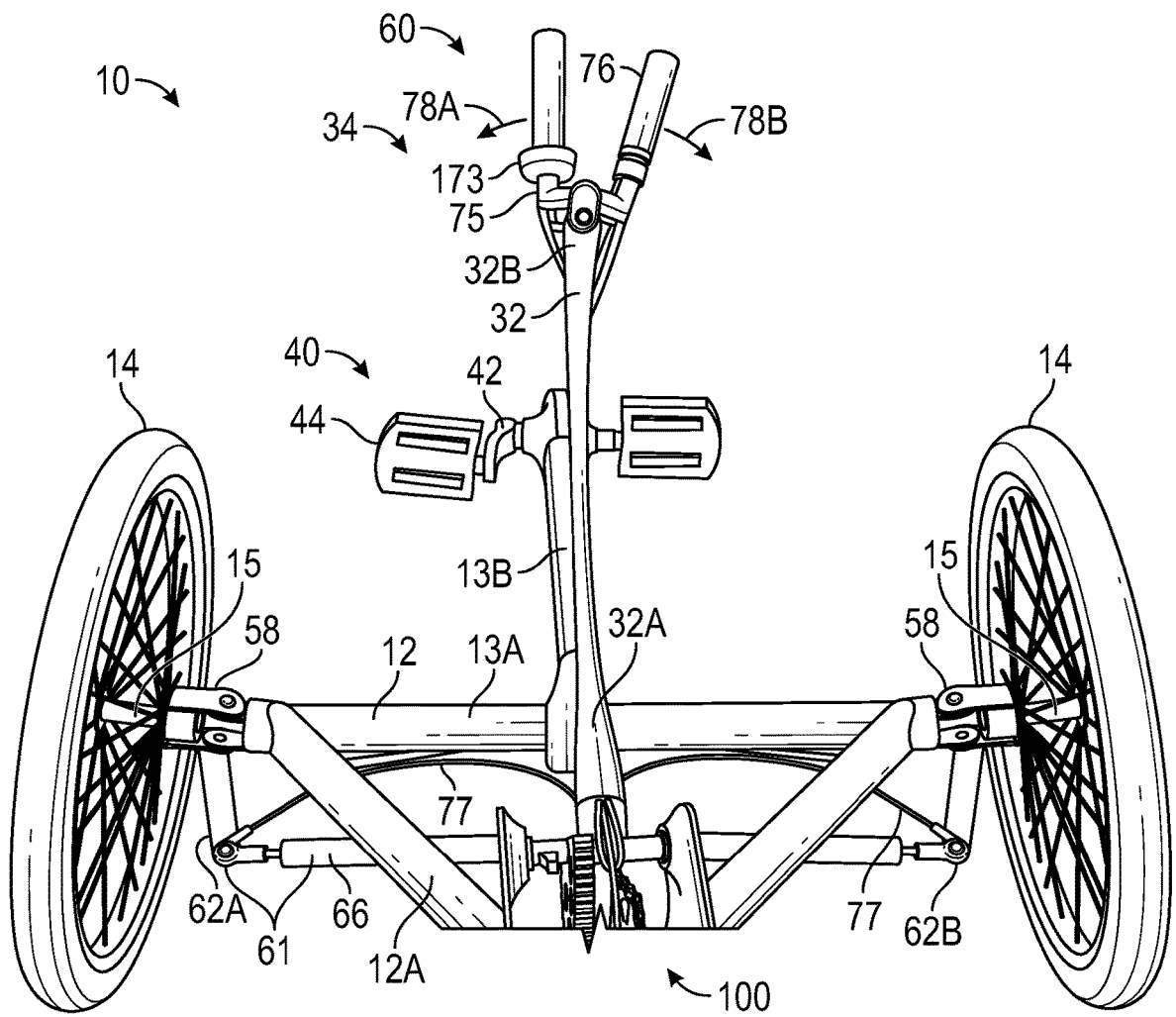
FIG. 1B is a forward-looking partial perspective view of the front portion of the tricycle of FIG. 1A.

Referring now to FIGS. 1A and 1B, an embodiment of a pedal vehicle and in particular a recumbent combination pedal and rowing tricycle 10 is shown. In this embodiment, tricycle 10 generally includes a frame 12, a pair of non-driven wheels 14 rotatably coupled to frame 12, a drive wheel 16 rotatably coupled to frame 12, and a seat 20 mounted to frame 12. Wheels 14, 16 support frame 12 above the ground. In this embodiment, non-driven wheels 14 are positioned at the front of frame 12, and thus, may also be referred to herein as front wheels 14; while drive wheel 16 is positioned at the rear of frame 12, and thus, may also be referred to herein as rear wheel 16. A transmission 100 is mounted to frame 12 between front wheels 14 and rear wheel 16. As will be described in more detail below, transmission 100 transfers torque to drive wheel 16 during operation of tricycle 10.

Frame 12 includes a first or front frame portion 12*a* extending longitudinally, forward of transmission 100 and a second or rear frame portion 12*b* extending longitudinally, rearward of transmission 100. As best shown in FIG. 1B, front frame portion 12*a* includes a cross member 13A extending laterally (left-to-right), and a leg 13B extending forward and upward from cross member 13A. Front wheels 14 are positioned at the ends of cross member 13A and are coupled to a front axle 15 extending through cross member 13A. In this embodiment, front wheels 14 are not driven but rotate freely relative to cross member 13A and frame 12.

Rear wheel 16 is rotatably mounted to rear frame portion 12*b* via a horizontal drive axle 16A. A gear or sprocket 17 is mounted to drive axle 16A and coupled by a chain 18 to a sprocket or gear within the transmission 100 to transfer torque from transmission 100 to drive wheel 16. Since sprocket 17 and corresponding chain 18 drive the rotation of rear wheel 16, sprocket 17 and chain 18 may also be referred to herein as drive sprocket 17 and drive chain 18. Sprocket 17 has 15 teeth.

In FIG. 1A, drive axle 16A is longitudinally spaced from transmission 100 by a horizontal distance that is greater than the radius of wheel 16, and front axles 15 are longitudinally spaced from transmission 100 by a horizontal distance that is greater than the radius of wheels 14. Horizontally and longitudinally, transmission 100 is located at a mid-region of tricycle 10. Seat 20 is mounted to rear frame portion 12*b* via one or more mounting brackets 22. In the embodiment of FIGS. 1A, 1B, wheels 14, 16 are 20 inch spoked bicycle wheels.

In this embodiment, tricycle 10 also includes a rowing assembly 30 and a pedal assembly 40, both of which can be used to provide locomotive power to tricycle 10 by inducing rotational torque to drive wheel 16. Transmission 100 is operationally coupled to both rowing assembly 30 and pedal assembly 40. Rowing assembly 30 includes a rowing arm or post 32 having a first or proximal end 32A adjacent transmission 100, a second or distal end 32B distal transmission 100, and a handle 34 at distal end 32B that may be gripped by a rider (not shown). Rowing post 32 may include one or more other handles (e.g., handle 34) or other gripping features (e.g., steering wheel) to allow a user to grip and manipulate rowing post 32 during operations.

To provide locomotive power to tricycle 10 via rowing assembly 30, a rider (not shown) grips handle 34 and pulls and pushes rowing post backward and forward, respectively, in arcuate directions 37, 33, respectively, so that post 32 pivots back and forth relative to transmission 100 and end 32A along. As will be described in more detail below, the pulling and/or pushing of rowing post 32 may cause rotation of one or more sprockets or gears within transmission 100 that drive rotation of rear wheel 16. In this embodiment, rowing post 32 is approximately 21.022.0 inches in length (inclusive of endpoints); however, it should be appreciated that the exact length of rowing post 32 may vary based on the desired arc length and location of the rowing post 32 (e.g., along directions 33, 37) during operations. In other embodiments, the length of rowing post 32 is set based on the body size and build of the rider, and in some of these embodiments may be set as 30-33% of the body height of the rider, inclusive of endpoints.

Referring still to FIG. 1A, pedal assembly 40 includes a pair pedal arms 42 rotationally coupled to front frame portion 12*a* at a pedal assembly axle 41. More specifically, pedal assembly axle 41 is located at the distal end of leg 13B, in front of cross member 13A and wheels 14 at an elevation above cross member 13A. A pedal 44 is rotatably coupled to a terminal end of each of the pedal arms 42. Pedal assembly 40 is located in front of seat 20 and transmission 100. Pedal assembly axle 41 is spaced apart longitudinally from transmission 100 by a horizontal distance greater than the length of pedal arms 42. Thus, parallel to and radially offset from drive axle 16A. During operations, a rider (not shown) places their feet on pedals 44 and pushes so that pedal arms 42 are driven to rotate the axle 41 and to rotate a gear or sprocket 46 mounted on axle 41 within front frame portion 12a. The rotation of sprocket 46 causes the rotation of a sprocket or gear within transmission 100 via a chain 48. Since sprocket 46 is directly rotated by pedals 44, and sprocket 46 directly drives chain 48, sprocket 46 may also be referred to herein a pedal gear or pedal sprocket, and chain 48 may also be referred to herein as a pedal chain. Sprocket 46 rotated directly by pedal arms 42 via axle 41 and has 23 teeth.

Referring again to FIG. 1B, the front suspension and steering assembly of tricycle 10 will now be described. A first non-driven wheel 14 is coupled to cross member 13A of frame 12 at a first steerable coupling 58, and the second non-driven wheel 16 is coupled to the frame at a second steerable joint or coupling 58. Tricycle 10 includes steering assembly 60 integrated with rowing assembly 30 that includes steering cross member 66 the handle 35, a steering linkage 61 coupled between the first and second non-driven wheels, and a pair of steering cables 77 coupling and extending from steering linkage 61 to handle 34. Handle 34 is u-shaped and is pivotally coupled at the distal end 32B of rowing post 32. Thus, handle 35 is configured both as a steering handle to pivot laterally (left and right) relative to post 32 and as a pumping handle to pump the rowing post 32 back and forth about the axis of a shaft 110 (e.g. reciprocating post 32 longitudinally with respect to frame 12). Steering linkage 61 includes a pair of steering arms 62A, 62B spaced apart and a steering cross member 66 pivotally coupled between arms 62A, 62B. Each steering arm 62A, 62B extends from one of the steering couplings 58 on the left or right side of tricycle 10. Steering cross member 66 is parallel and spaced apart from cross member 13A. Handle 34 is generally U-shaped and includes a first or left handle arm 75 and second or right handle arm 76. Handle arms 75, 76 extend away from rowing post 32, generally upward. A gear selector 173 is integrated into left handle arm 75, and a gear selector cable (shown in a later figure) extends through rowing post 32 to gear selector 173. One end of a first steering cable 77 is coupled to the first or left steering arm 62A distal steering coupling 58 and its other end is coupled and to the right handle arm 76. One end of a second steering cable 77 is coupled to the second or right steering arm 62B distal steering coupling 58 and its other end is coupled to the left handle arm 75. From each steering arm 62A, B, a cable 77 extends diagonally toward cross member 13A of frame 12 and the lateral center of frame 12. They extend longitudinally towards the rear of tricycle 10 and into transmission 100. Cables 77 wrap around shaft 110 and extend through rowing post 32 to reach handle 34, where cables 77 separate left and right, as described above. As described, steering assembly 60 is configured such that pivotal movement of the handle 34 about the distal end 32B of rowing post 32 in a first or left direction 78A exerts a force through the first steering cable 77 to the left steering arm 62A, turning wheels 14 in a first or left direction in the horizontal plane. Pivotal movement of the handle 34 about the distal end 32B of rowing post 32 in a second direction 78B exerts a force through the second steering cable to on the second steering arm 62B, turning wheels 14 in a second or right direction in the horizontal plane.

Figure 2:
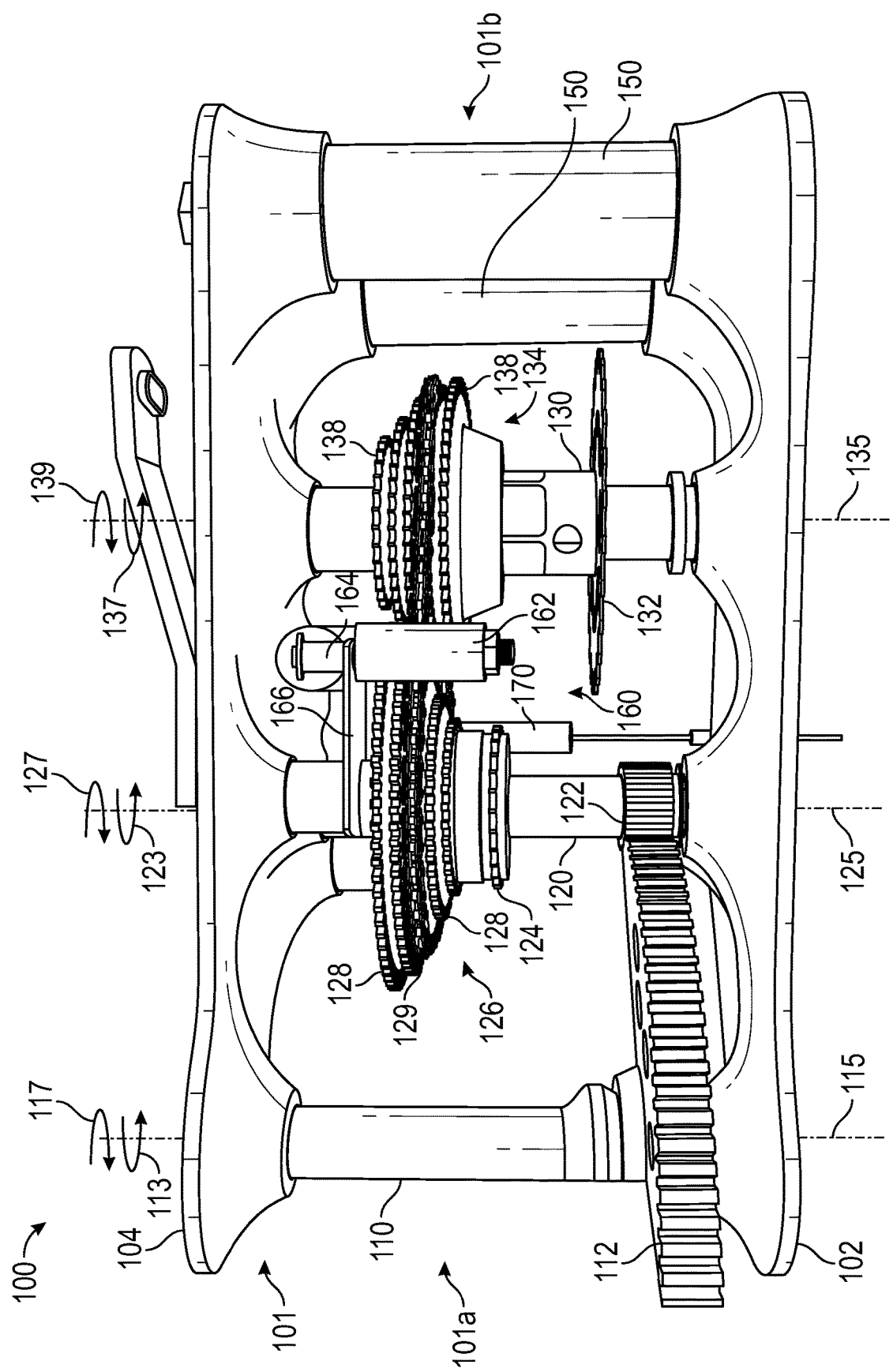
FIGS. 2-5 are perspective views of the transmission of FIG. 1A.

Referring now to FIG. 2, transmission 100 is shown. Transmission 100 generally includes a housing 101 having a first support frame 102 and a second support frame 104 laterally spaced from one another via a plurality of support struts 150. In addition, housing 101 includes a first end 101A and a second end 101B opposite first end 101A. In general, housing 101 provides support for various other components of transmission 100.

A rotatable shaft 110 extends between support frames 102, 104 along a central axis of rotation 115. Thus, shaft 110 may freely pivot or rotate about an axis 115 relative to support frames 102, 104 during operations. A toothed arcuate gear member or toothed rack 112 is mounted to shaft 110 such that when shaft 110 rotates or pivots about axis 115, toothed rack 112 also rotates about axis 115. Specifically, toothed rack 112 comprises an arcuate section of a circular gear that may extend angularly about axis 115 between 0° and 100°, or in some embodiments between 0° and 90°, inclusive of endpoints. Referring briefly to FIGS. 1A and 2, the proximal end 32A of the rowing post 32 is coupled to shaft 110 so that arcuate movement of post 32 along directions 33, 37 (see FIG. 1A) causes a reciprocal pivoting of shaft 110 and toothed rack 112 about axis 115 during operations, which transfers rotation and torque into transmission 100.

Referring again to FIG. 2, a rotatable shaft 120 also extends between support frames 102, 104 along a central axis of rotation 125, which is oriented parallel to and radially spaced from axis 115. Shaft 120 may freely pivot or rotate about axis 125 relative to support frames 102, 104 during operations. A spur gear 122 is fixably mounted to shaft 120 so that shaft 120 and spur gear 122 rotate together about axis 125. In this embodiment, spur gear 122 is welded to shaft 120. The teeth of spur gear 122 intermesh and engage mating teeth on toothed rack 112. As a result, reciprocating the rowing post 32 in the directions 33, 37 causes shaft 110 and toothed rack 112 to rotate back and forth about axis 115 and causes spur gear 122 and shaft 120 to rotate in a single direction about axis 125. An input sprocket 124 is also fixably mounted to shaft 120 to rotate with shaft 120. In this embodiment, input sprocket 124 has 13 teeth. Input sprocket 124 is operationally coupled to pedal assembly 40 by chain 48 extending about axle 48 and engaging sprocket 46 (see FIG. 1A). During operations, rotation of arms 42 of pedal assembly 40 causes rotation of shaft 120 (see FIG. 1A). Thus, shaft 110, toothed rack 112, gear 122, and sprocket 124 are configured as input members to receive torque into the transmission 100. In this embodiment, spur gear 122 includes 13 teeth, and toothed rack 112 includes 48 teeth disposed across an angular span of 120°, so a full 360° gear would have 144 teeth. For typical usage, it is estimated that rowing post 32 and toothed rack 112 will be stroked (e.g. rotated or pivoted) only ¼ of a full revolution or 90 degrees.

In the various embodiments, the sizes (e.g. number of teeth) of the various gears are selected so that one revolution of pedals 44 and pedal sprocket 46 corresponds to a 90 degree stroke of rowing post 32 and toothed rack 112 when rowing is occurring. In some embodiments, this pedaling:rowing ratio, defined as the number of revolutions of pedals 44 and sprocket 46 about axle 41 per 90 degree stroke of rowing post 32, is instead greater than 1:1 and less than 2:1. As an example, when the pedaling:rowing ratio is selected to be 1.5:1, the vehicle is configured so that the pedals would rotate 1.5 times during each 90 degree stroke of rowing post 32. In some embodiments, this pedaling:rowing ratio is less than 1:1 and greater than 1:3 (for example greater than a value of 0.333). Other pedaling:rowing ratios are contemplated. The pedaling:rowing ratio influences the power generation efficiency or "ergonomic efficiency" of the vehicle as may be experienced by a rider. When the pedaling:rowing ratio is lower, for example 1:0.75, a rider may exhibit a relatively low endurance. For example, the rider may, in a relatively short period of time, feel strained or exhausted with respect to cardiovascular activity or upper body muscle fatigue. With a higher pedaling:rowing ratio, for example 1:1, 1.25:1, or 2:1, the rider may feel more comfortable or may exhibit greater endurance while operating the vehicle.

A rotatable shaft 130 extends between support frames 102, 104 along a central axis of rotation 135. Axis 135 is parallel to and radially offset from axes 115, 125. Rotatable shaft 130 is mounted rotatably between support frames 102, 104 so that shaft 130 may freely pivot or rotate about axis 135 relative to support frames 102, 104 during operations. In this embodiment, shaft 130 is mounted by a pair of bearings (not shown) that are disposed between each support frame 102, 104 and the embedded ends of shaft 130. An output sprocket 132 (which in this embodiment has 25 teeth) is mounted to shaft 130 and is operationally coupled via chain 18 extending about drive axle 16A and engaging sprocket 17 (see FIG. 1A) to drive the rotation of rear wheel 16 on axle 16A. Output sprocket 132 is mounted to shaft 130 so that when shaft 130 rotates about axis 135, output sprocket 132 also rotates about axis 135, and vice versa. As mounted in tricycle 10 of FIG. 1A, axes 115, 125, 135 are positioned parallel to and radially offset from pedal assembly axle 41 and from drive axle 16A.

Referring still to FIG. 2, a first transmission bundle 126 is coupled to rotatable shaft 120 via a first freewheel assembly (not visible in FIG. 2 because it is disposed between first transmission bundle 126 and shaft 120. The first freewheel assembly includes a combination of bearings and clutch elements known in the art for allowing relative rotation between two components in a first rotational direction but preventing relative rotation between the two components in a second rotational direction opposite the first rotational direction. First transmission bundle 126 includes a plurality of sprockets 128 that have a reducing number of teeth and diameter moving from one end to the other along axis 125. Specifically, in this embodiment, the sprockets 128 of bundle 126 have declining or decreasing number of teeth and declining or decreasing diameter moving axially along axis 125 from second support frame 104 toward first support frame 102, so that the first transmission bundle has a conical profile in side view (e.g., see FIG. 2). The specific numbers of gear teeth and diameters of sprockets 128 may be greatly varied in different embodiments; however, in this embodiment, the number teeth for sprockets 128 are 25, 23, 21, 19, and 17 when moving along axis 125 from second support frame 104 toward first support frame 102.

First freewheel assembly (not visible) is configured so that when shaft 120 rotates about axis 125 in a first direction 123, first transmission bundle 126 is not fixably coupled to shaft 120 and is not forced to rotate about axis 125 with shaft 120 in first direction 123. However, when shaft 120 is rotated about axis 125 in a second direction 127 opposite first direction 123, first freewheel assembly engages and fixably couples transmission bundle 126 to shaft 120, thereby forcing transmission bundle 126 to rotate about axis 125 with shaft 120 in second direction 127. Input sprocket 124 is also mounted to first freewheel assembly so that when input sprocket 124 rotates about axis 125 in second direction 127, first freewheel assembly engages and fixably couples input sprocket 124 to shaft 120, thereby forcing shaft 120 to rotate about axis in second direction 127 with input sprocket 124. However, when input sprocket 124 rotates about axis 125 in first direction 123, input sprocket 124 is not fixably coupled to shaft 120 and shaft 120 is not forced to rotate with input sprocket 124 in direction 123. The arrangement of first freewheel assembly on shaft 120 allows a rider to manipulate rowing assembly 30 (see FIG. 1A) to pivot toothed rack 112 in a first direction 113 about axis 115 to cause shaft 120 to rotate about axis 125 in second direction 127 (via the engagement between toothed rack 112 and spur gear 122) so that sprockets 128 on first transmission bundle 126 are also forced to rotate about axis 125 in direction 127 during operations. However, if the rider manipulates rowing assembly 30 (see FIG. 1A) to pivot toothed rack 112 in a second direction 117 about axis 115 to cause shaft 120 to rotate about axis 125 in first direction 123, input sprocket 124 and sprockets 128 of first transmission bundle 126 will not rotate along with shaft 120 about axis 125 in direction 123. Referring briefly again to FIG. 1A, as a result of the arrangement of first freewheel assembly, in this embodiment, a rider may drive propulsion of tricycle 10 (see FIG. 1A) when pulling rowing post 32 in arcuate direction 37, but does not drive propulsion of tricycle when pushing the rowing post 32 in arcuate direction 33.

Referring again to FIG. 2, a second transmission bundle 134 is coupled to rotatable shaft 130 with a second freewheel assembly (not visible in FIG. 2). Similar to the first freewheel assembly described above, the second freewheel assembly includes a combination of bearings and clutch elements known in the art for allowing relative rotation between two components in a first rotational direction but preventing relative rotation between the two components in a second rotational direction opposite the first rotational direction. Second transmission bundle 134 includes a plurality of sprockets 138 that have a reduced number of teach and diameter moving from one end to the other along axis 135. Specifically, in this embodiment, the sprockets 138 on bundle 134 have a declining or decreasing number of teeth and a declining or decreasing diameter moving axially along axis 135 from first support frame 102 toward second support frame 104, so that the second transmission bundle 134 has a conical profile in side view (e.g., see FIG. 2). The specific numbers of gear teeth and diameters of sprockets 138 may be greatly varied in different embodiments; however, in this embodiment, the number teeth for sprockets 138 are 21, 19, 17, 15, and 13 when moving along axis 135 from first support frame 102 toward second support frame 104.

Second freewheel assembly (not visible) is configured so that when second transmission bundle 134 rotates about axis 135 in a first direction 137, shaft 130 is not fixably coupled to second transmission bundle 134 and is not forced to rotate about axis 135 with second transmission bundle 134. However, when second transmission bundle 134 is rotated about axis 135 in a second direction 139, second freewheel assembly engages and fixably couples second transmission bundle 134 to shaft 130, thereby forcing shaft 130 and output sprocket 132 to rotate about axis 135 in direction 139 with second transmission bundle 134, as well as transferring torque to rear wheel 16 (see FIG. 1A).

Referring briefly again to FIGS. 1 and 2, the arrangement of second freewheel assembly on shaft 130 allows a rider to transfer torque from first transmission bundle 126 to second transmission bundle 134 (e.g., via rowing assembly 30 and/or pedal assembly 40), and then to drive wheel 16 via rotation of second transmission bundle 134 and shaft 130 about axis 135 in direction 139. In addition, if the rider is coasting on tricycle 10 and not applying torque to transmission bundles 126, 134 (e.g., via rowing assembly 30 and/or pedal assembly 40), drive wheel 16 is allowed to freely spin so that shaft 130 and output sprocket 132 may rotate freely in direction 139 relative to transmission bundle 134.

Referring again to FIG. 2, first transmission bundle 126 and second transmission bundle 134 are arranged on shafts 120, 130, respectively, so that the largest sprocket 128 on first transmission bundle 126 (e.g., largest diameter and largest number of teeth) is generally axially aligned (along axes 125, 135) with the smallest sprocket 138 on second transmission bundle 134 (e.g., smallest diameter and/or smallest number of teeth), and so that the smallest sprocket 128 on first transmission bundle 126 is generally axially aligned (along axis 125, 135) with the largest sprocket 138 on second transmission bundle 134. Thus, in the embodiment of transmission 100 shown in FIG. 2, the 17 tooth sprocket 128 of first transmission bundle 126 is generally axially aligned with the 21 tooth sprocket 138 of second transmission bundle 134, defining first gear ratio or a "first gear"; the 19 tooth sprocket 128 of first transmission bundle 126 is generally axially aligned with the 19 tooth sprocket 138 of second transmission bundle 134, defining second gear ratio or a "second gear"; the 21 tooth sprocket 128 of first transmission bundle 126 is generally axially aligned with the 17 tooth sprocket 138 of second transmission bundle 134, defining third gear ratio or a "third gear"; the 23 tooth sprocket 128 of first transmission bundle 126 is generally axially aligned with the 15 tooth sprocket 138 of second transmission bundle 134, defining forth gear ratio or a "forth gear"; and the 25 tooth sprocket 128 of first transmission bundle 126 is generally axially aligned with the 13 tooth sprocket 138 of second transmission bundle 134, defining fifth gear ratio or a "fifth gear". Thus, this embodiment includes five dedicated or "aligned" pairs of sprockets 128, 138 from bundles 126, 134 such that each sprocket 182 on first transmission bundle 126 is coupled via a chain 129 to only one aligned sprocket 138 on second transmission bundle 134.

Chain 129 is disposed about the first transmission bundle 126 and about the second transmission bundle 134. As suggested above, chain 129 engages an aligned pair of sprockets 128, 138. Specifically, chain 129 is engaged or meshed with the teeth on one of the sprockets 128 on first transmission bundle 126 and with the teeth on one of the sprockets 138 on second transmission bundle 134 to transfer rotational torque between transmission bundles 126, 134. As a result, rotation of sprockets 128 in first transmission bundle 126 about axis 125 causes rotation of sprockets 138 on second transmission bundle 134 about axis 135 via chain 129.

For the present example, the numbers of teeth for the several sprockets of tricycle 10 are summarized in Table 1, below. Gear ratios may be calculated from these values.

TABLE 1

Example Gear Configuration for Tricycle 10

| Tricycle 10 | For Pedaling | | | | For Rowing | |
|---|---|---|---|---|---|---|
| Description of Gear/Sprocket | ref. # | size (# teeth) | ref. # | size (# teeth) | ref. # | size (# teeth) |
| pedal sprocket | 46 | 23 | — | — | — | — |
| input sprocket | 124 | 13 | — | — | — | — |
| toothed rack | — | — | — | — | 112 | 144* |
| rowing input gear | — | — | — | — | 122 | 13 |
| transmission bundles sprockets: | 126 | — | 134 | — | 126 & 134 | |
| | 128 | 17 | 138 | 21 | Same as on the left | |
| | 128 | 19 | 138 | 19 | | |
| | 128 | 21 | 138 | 17 | | |
| | 128 | 23 | 138 | 15 | | |
| | 128 | 25 | 138 | 13 | | |
| output sprocket | — | — | 132 | 25 | 132 | 25 |
| drive sprocket | — | — | 17 | 15 | 17 | 15 |

*The teeth stated for the toothed rack 112 are for a full 360°, to facilitate consideration of the gear ratio.

In this embodiment, the generally axially aligned pairs of sprockets 128, 138 of bundles 126, 134, respectively, are actually slightly axially offset from one another. Specifically, in this embodiment, the sprockets 128, 138 discussed above are axially misaligned by approximately 1/16 of an inch. Without being limited to this or any other theory, the slight axial misalignment of sprockets 128, 138 provides a slight cant or bias of chain 129 that helps to facilitate transferring or derailing of chain 129 between different aligned pairs of sprocket 128, 138 to change the gear ratio of transmission 100. However, it should also be appreciated that in other embodiments, the aligned sprockets 128, 138 from bundles 126, 134 are not axially offset and are substantially more precisely axially aligned along parallel axes 125, 135. In addition, in this embodiment, transmission bundles 126, 134 are placed relatively close together in the radial direction with respect to axes 125, 135, such that axis 125 is approximately 5.0 inches from axis 135. As a result, the teeth of aligned pairs of sprockets 128, 138 may be approximately 1/8 to 1/16 inches apart in the radial direction (inclusive of endpoints). Other embodiments may use other distances between sprockets 128, 138 and/or axes 125, 135.

Figure 3:
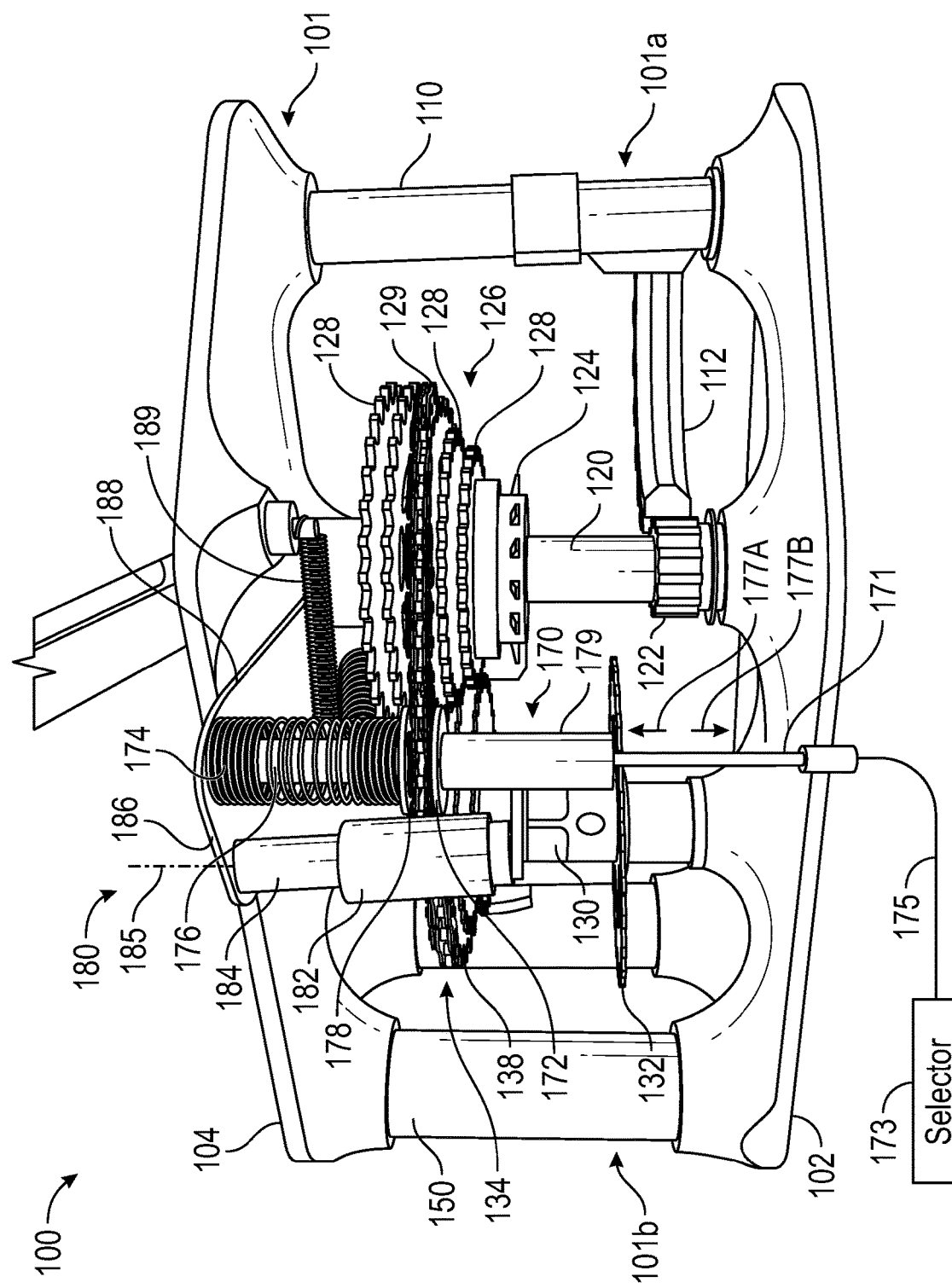

Referring now to FIG. 3, a gear shifting or de-railer assembly 170 is mounted to housing 101 proximate transmission bundles 126, 134. As will be described in more detail below, gear shifting assembly 170 is configured to move chain 129 in directions 177A, 177B (which are generally parallel to axes 115, 125, 135) relative to sprockets 128, 138 in transmission bundles 126, 134.

In this embodiment, gear shifting assembly 170 includes a central shaft 176 that is mounted to second support frame 104 with a mounting bracket 188, a saddle or spool 172 that is axially movable along shaft 176 in directions 177A, 177B, and a sleeve member 179 axially movably disposed on shaft 176 in directions 177A, 177b. Sleeve member 179 is positioned axially adjacent spool 172. Spool 172 functions as an actuator that bears against an external surface of a chain to move the chain from one sprocket or pair of sprockets to another sprocket or pair of sprockets. In this embodiment, spool 172 bears against chain 129 to move chain 129 between aligned sprockets 128, 138 of transmission bundles 126, 134.

In addition, gear shifting assembly 170 includes a biasing member 174 that biases or pushes spool 172 towards the side of transmission bundles 126, 134 that tis proximal support frame 102. In this embodiment, biasing member 174 is a coiled spring disposed about shaft 176 between spool 172 and mounting bracket 188. A conduit 171 is engaged with sleeve member 179 and receives a gear selector cable 175 slidably extending therethrough. Cable 175 extends from selector 173, through conduit 171 to sleeve member 179. During operations, a rider (not shown) may manipulate selector 173 to move conduit 171 relative to cable 175. Because conduit 171 is engaged with sleeve member 170, movement of conduit 171 also causes movement of sleeve member 179 along shaft 176 so that spool 172 may also move along shaft 176 in direction 177A, 177B via the engagement between spool 172 and sleeve member 179. As a result, manipulation of selector 173 causes spool 172 to be controllably and selectively moved along shaft 176 in direction 177A, 177B. Without being limited to this or any other theory, biasing member 174 provides a general bias to urge spool 172 along direction 177B toward first support frame 102. To change gears in transmission bundles 126, 134, sleeve member 179 and spool 172 may be moved along shaft 176 in the direction 177A toward second support frame 104 via selector 173 and tension in cable 175, in opposition to spring 174. Alternatively, to change gears in the opposite direction, selector 173 may be adjusted to allow cable 175 to relax so that spring 174 urges spool 172 to move toward first support frame 102 in direction 177A. In some embodiments, the direction of the force of biasing member 174 and the direction of the tensioning capability of cable 175 are reversed to accomplish the same gear ratio changes in a second manner.

Figure 4:
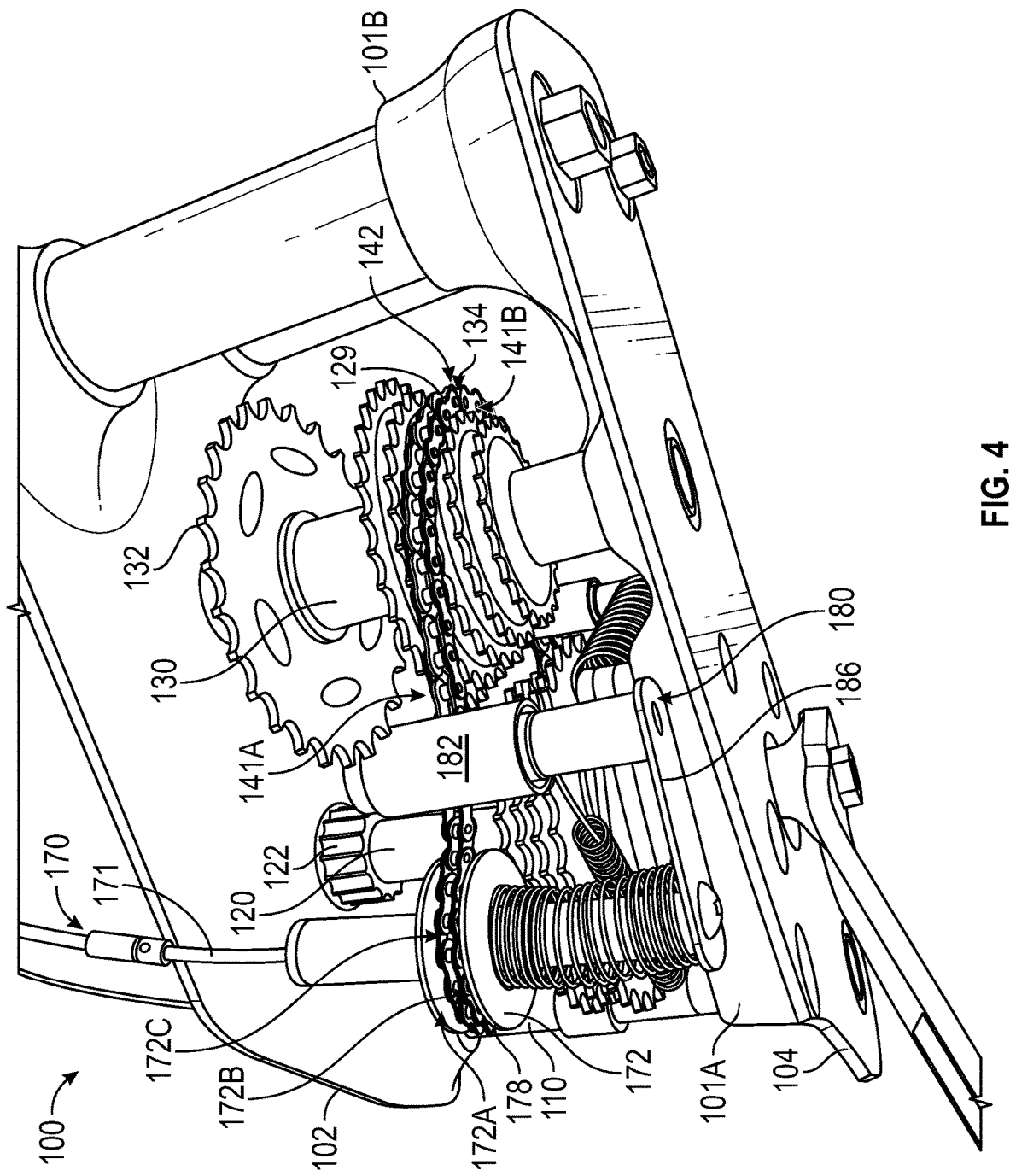
Figure 5:
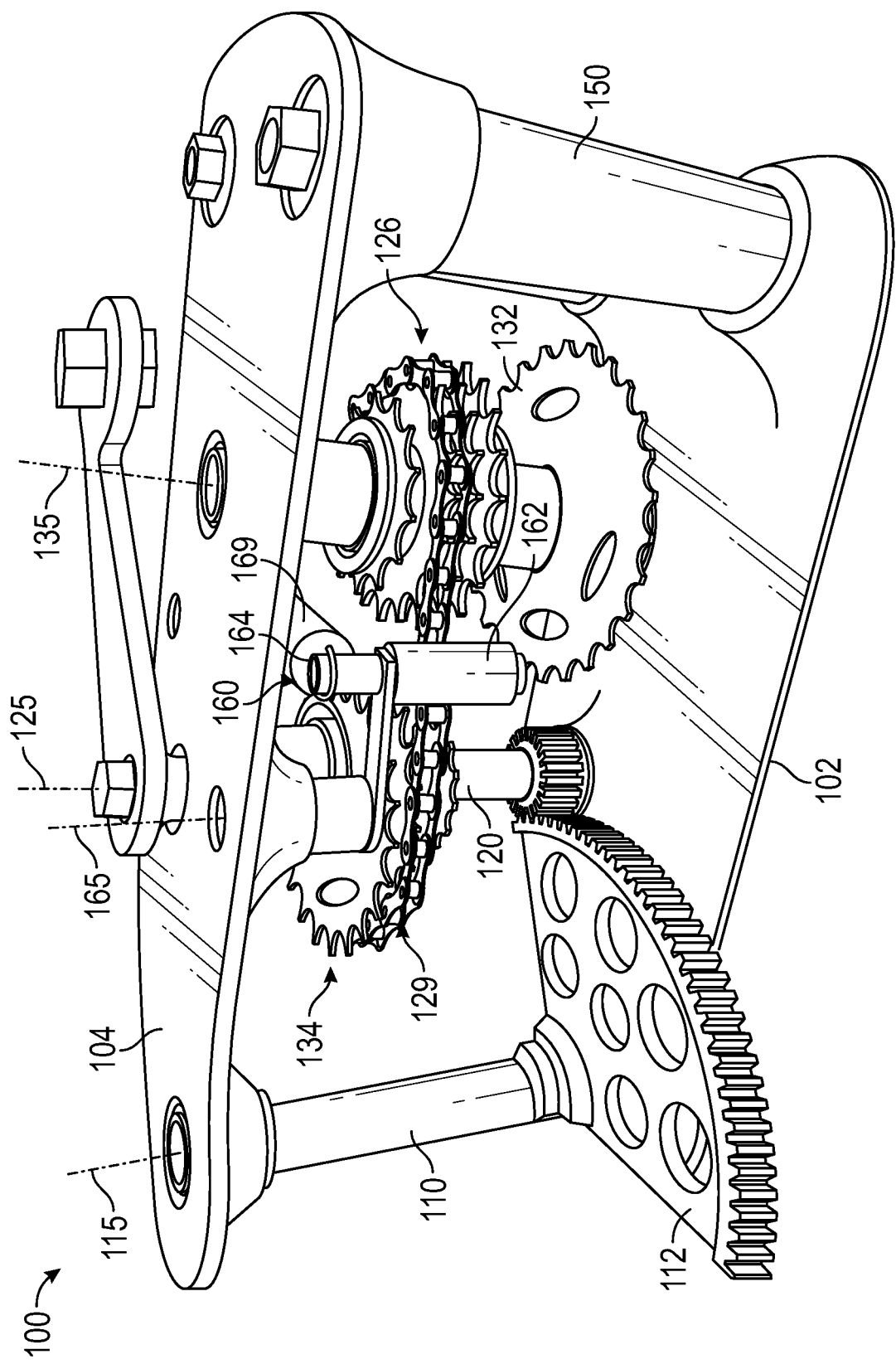

Referring to FIG. 4, spool 172 includes an annular recess or receptacle 178 defined by a first planar side surface 172A, a second planar side surface 172B oriented parallel to and spaced from side surface 172A, and a cylindrical base surface 172C extending between side surfaces 172A, 172B. Chain 129 is slidably seated in annular receptacle 178 and extends at least partially about the cylindrical base surface 172C. In particular, chain 129 includes a first side 141A adjacent surface 172A, a second side 141B adjacent side 172B, an outer face 142, and an inner open face engaging surface 172C.

In this embodiment, shaft 176 and spool 172 of gear shifting assembly 170 are disposed more proximate first transmission bundle 126 than second transmission bundle 134. Without being limited to this or any other theory, by placing spool 172 relatively closer to first transmission bundle 126, the rigidity of the chain 129 extending about transmission bundles 126, 134 and spool 172 prevents spool 172 from traversing in direction 177A, 177B more than is necessary to force movement of chain 129 between two immediately axially adjacent sprockets 138 on second transmission bundle 134. Thus, for example, the placement of spool 172 more proximate to first transmission bundle 126 prevents chain 129 from skipping an immediately adjacent sprocket 138 on bundle 134 in a single movement of chain 129 or reduces the potential for this type of occurrence.

As shown in FIG. 3, chain 129 is fitted into spool 172 so that when spool 172 is moved along shaft 176 in directions 177A, 177B in the manner described above, chain 129 is also moved in directions 177A, 177B relative to sprockets 128, 138 of transmission bundles 126, 134. To move chain 129, spool 172 is configured so a planar side surface 172A, 172B bears against an external side 141A, 141B, respectively, of chain 129, depending on which of the two directions 177A, 177B is selected. Thus, during operations, by manipulating selector 173, the rider (not shown) may move the chain between different axially aligned pairs of sprockets 128, 138 of transmission bundles 126, 134 to change the gear ratio applied between input sprocket 124, 122 on shaft 120 and output sprocket 132 on shaft 130.

Referring now to FIGS. 2 and 3, a pair of chain tensioning assemblies 160, 180 are disposed on opposing sides of chain 129 and transmission bundles 126, 134. First chain tensioning assembly 160 includes a shaft 164, a bearing member 162 disposed on shaft 164, and a mounting arm 166 coupling shaft 164 to second support frame 104. Bearing member 162 may also be called an idler wheel, and mounting arm 166 may also be called an idler arm. Mounting arm 166 is pivotably mounted to second support frame 104 so that arm 166 and shaft 164 may pivot about an axis 165 that is generally parallel to and radially offset from axes 115, 125, 135. A biasing member 169 is mounted to second support frame 104 and to shaft 164 such that arm 166 is rotatably biased about axis 165 toward chain 129 and shaft 164, and bearing member 162 is biased into engagement with chain 129 to maintain tension on the chain 129. In this embodiment, biasing member 169 comprises a coiled spring; however, any other suitable biasing member configured to bias to members toward one another may be used in other embodiments (e.g., a torsional biasing member coupled to arm 166 and/or shaft 164).

As best shown in FIGS. 3 and 4, second chain tensioning assembly 180 includes a shaft 184, a bearing member 182 disposed on shaft 184, and a mounting arm 186 coupling shaft 184 to mounting bracket 188 and second support frame 104. Bearing member 182 may also be called an idler wheel, and mounting arm 186 may also be called an idler arm. Mounting arm 186 is pivotably mounted to mounting bracket 188 so that arm 186 and shaft 184 may pivot about an axis 185 that is generally parallel to and radially offset from axes 115, 125, 135 (see FIG. 2). A biasing member 189 is mounted to second support frame 104 and to shaft 184 so that arm 186 is rotatably biased about axis 185 toward chain 129 and shaft 184, and bearing member 162 is biased into engagement with chain 129 to maintain tension on the chain 129. In this embodiment, biasing member 189 comprises a coiled spring; however, any other suitable biasing member configured to bias to members toward one another may be used in other embodiments (e.g., a torsional biasing member coupled to arm 186, bracket 188, and/or shaft 184). In this embodiment, mounting arm 186 and mounting bracket 188 each have a length of approximately 2 in. In addition, in some embodiments, bearing member 182 may have an outer diameter that ranges from ¾ inches to 1⅓ inches, inclusive of endpoints. However, other diameters are possible for bearing member 182 in other embodiments. Without being limited to this or any other theory, the biased engagement between bearing members 162, 182 and chain 129 maintains a desired amount of tension on chain 129 during operations to facilitate both the torque transfer between transmission bundles 126, 134 and the shifting or movement of chain 129 between different aligned pairs of sprockets 128, 138.

For tricycle 10, a plurality of transmission components that accomplish the ratio selection are assembled together in a common location, which in the example is housing 101, and resulting transmission 100 is radially spaced apart from the front wheels 14, and from the rear wheel 16 as previously discussed. In this embodiment, the plurality of components that accomplish the gear ratio selection include sprockets 128, 138, the chain 129, the portions of gear shifting assembly 170 that is disposed in transmission housing 101, including chain tensioning assemblies 160, 180. The plurality of transmission components that accomplish the ratio selection are all supported by housing 101. In this embodiment, transmission 100 is also radially spaced apart from pedal assembly 40.

Figure 6:
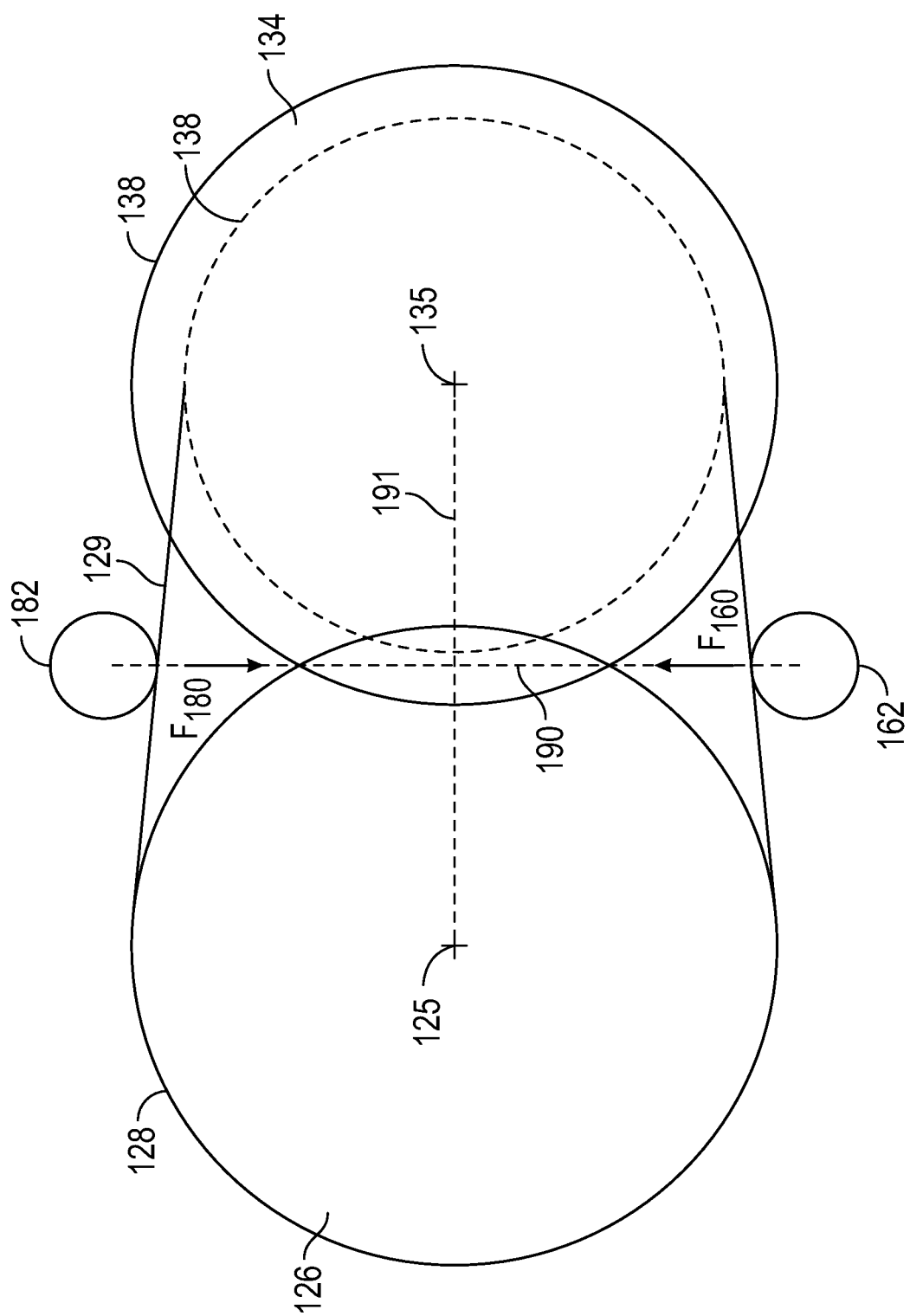
FIG. 6 is a schematic partial side view of the transmission of FIGS. 2-5.

Referring briefly to FIG. 6, in at least some embodiments, bearing members 162, 182 of chain tensioning assemblies 160, 180, respectively, engage with chain 129 so that they impart a biasing force $F_{160}$, $F_{180}$ to chain 129. Biasing forces $F_{160}$, $F_{180}$ are generally directed along a line 190 that bisects the region of overlap for the largest sprockets 128, 138 of transmission bundles 126, 134 as viewed in a direction parallel to axes 125, 135, where line 190 extends in a direction that is perpendicular to a line 191 extending between axes 125, 135. However, it should be appreciated that bearing members 162, 182 may engage with chain 129 in a number of different fashions and directions in other embodiments.

Referring again to FIG. 2, while shaft 130 of transmission 100 has been described as being mounted rotatably between support frames 102, 104, it should be appreciated that in other embodiments, shaft 130 may be fixed between support frames 102, 104 so that shaft 130 may not rotate about axis 135 relative to housing 101. In these embodiments, output sprocket 132 is mounted to the inner sleeve (not shown) of the second freewheel assembly (not shown), which is disposed between second transmission bundle 134 and shaft 130. Thus, during operations, the inner sleeve of the second freewheel assembly rotates about axis 135 in place of shaft 135. Otherwise, the function and operations of shaft 130 and transmission bundle 134 are the same as described above.

Figure 7:
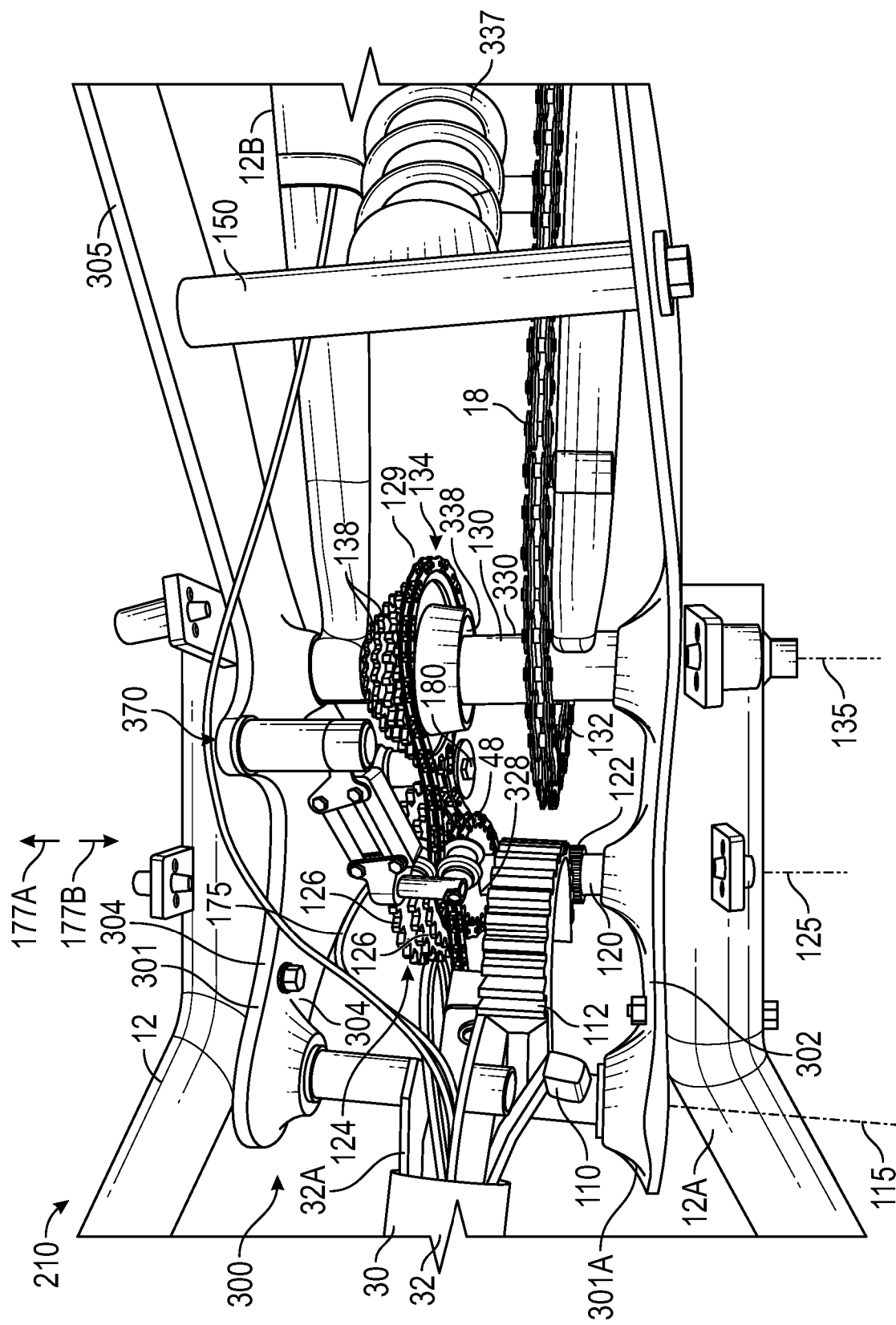
FIG. 7 is a top partial view of an embodiment of a recumbent combination pedal and rowing tricycle and transmission thereof in accordance with the principals disclosed herein.

Referring now to FIG. 7, another embodiment of a pedal vehicle and more specifically a recumbent combination pedal and rowing tricycle 210 is shown. In this embodiment, tricycle 210 includes a transmission 300 installed in a frame 12 with a rowing assembly 30 operationally coupled to frame 12 and transmission 300. Tricycle 210 is substantially the same as tricycle 10 previously described with the exception of transmission 300. For example, as shown in FIG. 7, frame 12 includes a first or front frame portion 12a extending forward of transmission 300 and a second or rear frame portion 12b extending rearward of transmission 300. In addition, tricycle 210 includes a pair of non-driven, front wheels 14 rotatably coupled to front frame portion 12a, a rear, drive wheel 16 rotatably coupled to rear frame portion 12b, a seat 20 mounted to frame 12, and pedal assembly 40 operationally coupled to frame 12, each configured as previously described.

Referring still to FIG. 7, transmission 300 includes a housing 301 having a first support frame 302 and a second support frame 304 separated from one another via a plurality shafts or axles and a support strut 150. Housing 301 is integrated with frame 12 and extends from a first end 301A to a seat supporting region 305 for seat 20 (not shown). Housing 301 provides support for various other components of transmission 300.

Transmission 300 includes several of the same features as transmission 100. For example, transmission 300 includes a rotatable shaft 110 mounted rotatably between support frames 302, 304 along an axis of rotation 115 and a toothed rack 112 mounted to shaft 110. Toothed rack 112 and shaft 110 are structurally and functionally as previously described with respect to transmission 100. The proximal end 32A of the rowing post 32 is coupled to shaft 110 so that arcuate movement of post 32 along in either of two directions 33, 37 (see FIG. 1A) causes a reciprocal rotation of shaft 110 and toothed rack 112 about axis 115 during operations. In addition, a rotatable shaft 120 is rotatably mounted between support frames 302, 304 along an axis of rotation 125, parallel to and radially offset from axis 115, drive axle 16A, and axle 41. Shaft 120 includes a spur gear 122, an input sprocket 124, and first transmission bundle 126 coupled to rotate with input sprocket 124. Spur gear 122 is mounted on shaft 120, rotates with shaft 120, and is meshed or engaged with toothed rack 112 on shaft 110 to receive torque from rowing assembly 30. Input sprocket 124 is operationally coupled to a chain 48 extending about shaft 120 and extending to and operationally coupling with pedal assembly 40 (See FIG. 1A). First transmission bundle 126 and input sprocket 124 are coupled to shaft 120 and to spur gear 122 via a first freewheel assembly 328 such that gear 122 may rotate first transmission bundle 126 via shaft 720, but first transmission bundle 126 and sprocket 124 are unable to rotate gear 122, at least not when pedals 44 or sprocket 46 is pedaled or rotated in a forward direction. Therefore, the operation of pedal assembly 40 will not cause toothed rack 112 and rowing post 32 to move. First transmission bundle 126 includes a plurality of sprockets 128 that have a reducing number of teach and diameter moving from moving axially along axis 125 from second support frame 304 toward first support frame 302. Shaft 120, gear 122, sprocket 124, chain 48, transmission bundle 126, the first freewheel assembly, and sprockets 128 are structurally and functionally as previously described with respect to transmission 100.

In transmission 300, an axle 330 (shown with dashed lines) is fixably coupled between support frames 302, 304 along an axis 135, which is parallel to and radially offset from axes 115, 125. A rotatable shaft 130 is received on axle 330 by a roller bearing (not shown) located radially between axle 330 and shaft 130. As in transmission 100, shaft 130 is configured to rotate relative to the associated support frames 302, 304. An output sprocket 132 is mounted to shaft 130 to rotate with shaft 130 and is operationally coupled via a chain 18 extending about sprocket 17 mounted to drive axle 16A (see FIG. 1A) to drive the rotation of rear wheel 16 on axle 16A. Rotatable shaft 130 also includes a second transmission bundle 134 coupled thereto via a second freewheel assembly 338. Second transmission bundle 134 includes a plurality of sprockets 138 that have a reduced number of teach and diameter moving from first support frame 302 toward second support frame 304. Other than the mounting of shaft 130 on axle 330, the shaft 130, the output sprocket 132, the transmission bundle 134, the second freewheel assembly, and the sprockets 138 are configured and may operate as described above with respect to transmission 100, including potential variations thereof. In transmission 300, rear frame portion 12B is attached to axle 330 by a pair of pivotable couplings 336. A resilient member, which in this example is a spring 337 maintains spacing between rear frame portion 12B and seat supporting region 305, which extends from transmission housing 301.

Similar to transmission 100 described above, first transmission bundle 126 and second transmission bundle 134 of transmission 300 are arranged on shafts 120, 130, respectively, so that the largest sprocket 128 on bundle 126 is generally axially aligned (along axes 125, 135) with the smallest sprocket 138 on bundle 134, and so that the smallest sprocket 128 on bundle 126 is generally axially aligned with the largest sprocket 138 on bundle 134. A chain 129, as described above, is disposed about the first transmission bundle 126 and about the second transmission bundle 134, engaging a dedicated, aligned pair of sprockets 128, 138. In this embodiment, the aligned or generally axially aligned sprockets 128, 138 discussed above are axially offset by approximately 0.020 of an inch, providing a slight cant or bias of chain 129, as discussed above. In this embodiment, transmission bundles 126, 134 are placed relatively close together in the radial direction with respect to axes 125, 135, so that axis 125 is approximately 5.0 inches from axis 135. Other embodiments may use another distance or range of distances between sprockets 128, 138. Transmission 300 is configured to allow a rider to select between a plurality of (e.g. five) gear ratios selectable by axial movement of chain 129 along bundles 126, 134, as described above with respect to transmission 100. In this embodiment, the numbers of teeth for the several sprockets of tricycle 210 are the same as those listed in Table 1 above.

Figure 8:
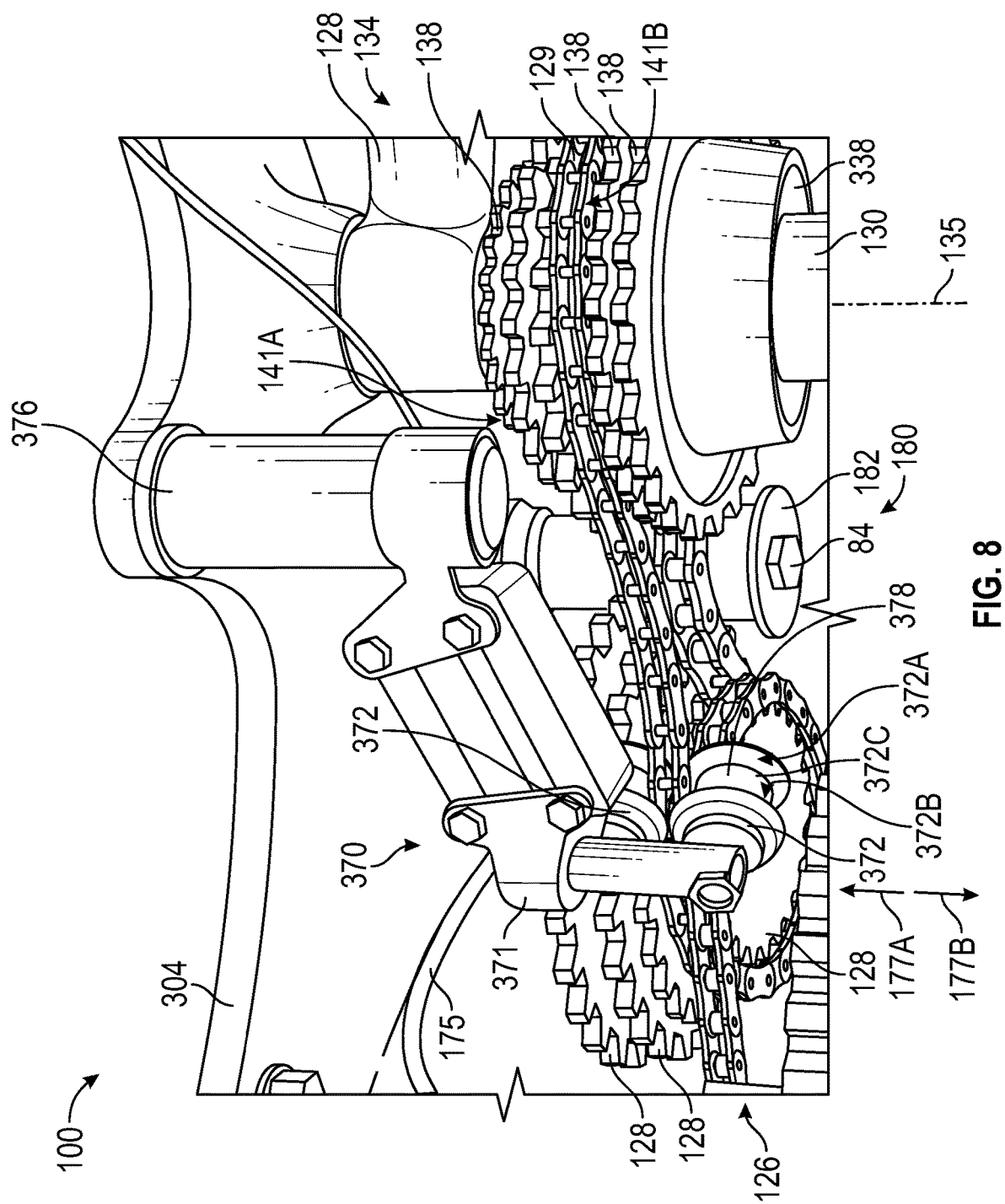
FIG. 8 is an enlarged perspective view of the gear shifting assembly of the transmission of FIG. 7.

Transmission 300 includes a gear shifting or de-railer assembly 370 that differs from the gear shifting assembly of transmission 100. As best shown in FIG. 8, gear shifting assembly 370 includes a stationary post 376 coupled to support frame 304 of housing 301 proximate transmission bundles 126, 134 and extending generally parallel to axes 115, 125, 135. Gear shifting assembly 370 also includes a spring-biased parallel arm mechanism 371 coupled at its first end to post 376 and a pair of space-apart, parallel saddles or spools 372 coupled to a second end of mechanism 371. A control cable 175 is coupled to mechanism 371 and extends within or along rowing post 32 to a gear selector (not shown) for a rider to operate. Spool 372 functions as an actuator that bears against an external surface of a chain to move the chain from one sprocket or pair of sprockets to another sprocket or pair of sprockets.

Referring to both FIG. 7 and FIG. 8, spools 372 are generally cylindrical and extend generally perpendicular to axes 115, 125, 135. Spools 372 are offset from axes 115, 125, 135, being located between sprockets 128, 138 of transmission bundles 126, 134. In this embodiment, spools 372 are located more proximate first transmission bundle 126 than second transmission bundle 134, and spools 372 straddle a tension section of chain 129 (i.e. a section of chain that is under tension during operation and delivering torque). Each spool 372 includes an annular receptacle 378 defined by a first planar side surface 372A, a second planar side surface 372B oriented parallel and spaced from the side surface 372A, and a cylindrical base surface 372C extending between side surfaces 372A, 372B. Chain 129 extends through a region between the facing receptacles 378 of spools 372 and may be disposed in receptacle(s) 378. At least when gear shifting assembly 370 is dormant, the section of chain 128 that is located between spools 372 may remain straight, not bent by assembly 370. Assembly 370 is configured such that chains 129 does not wrap around any member of assembly 370. In some embodiments, assembly 370 does not contact chain 129 while assembly 370 is dormant and contacts chain 129 only during a gear shifting operation.

Referring still to FIG. 8, during operation, a tension or additional tension may be applied by cable 175 to cause mechanism 371 to move spools 372 in a first direction 177A or a second direction 177B and toward or away from second support frame 304, moving parallel to axes 115, 125, 135. As a result a base surface 372C of one of the spools 372 bears against an external side 141A, 141B of chain 129. Relaxing the tension in cable 175 allows spring-loaded mechanism 371 to move spools 372 in the opposite direction 177B,A, causing the base surface 372C of the other spool 372 to bear against the opposite external side 141A, 141B of chain 129. As a result, gear shifting assembly 370 is configured to move chain 129 relative to the several aligned pairs of sprockets 128, 138 in transmission bundles 126, 134, along two opposite directions generally parallel to axes 115, 125, 135 to change the gear ratio applied between input sprocket or gear 124, 122 on shaft 120 and output sprocket 132 on shaft 130.

Without being limited to this or any other theory, by placing spool 372 around a tension side of chain 129 or by placing spool 372 relatively closer to first transmission bundle 126 than second transmission bundle 134, the rigidity of the chain 129 extending between bundles 126, 134 and spools 372 prevents spools 372 from traversing in direction 177A, 177B more than is necessary to force movement of chain 129 between two immediately axially adjacent sprockets 138 on second transmission bundle 134 or between two immediately axially adjacent sprockets 128 on first transmission bundle 126. In other words, the described placement of spools 372 prevents chain 129 from skipping an immediately adjacent sprocket 138, 128 in a single movement of chain 129 or reduces the potential for this type of occurrence. The distance between spools 372 and sprockets 138 is selected to allow chain 129 to flex as is moves across different sprockets 138.

Referring still to FIG. 7, a chain tensioning assembly 180 is disposed on the opposite side of transmission bundles 126, 134 as compared to gear shifting assembly 370. Chain tensioning assembly 180 of transmission 300 is configured like chain tensioning assembly 180 of transmission 300 discussed above. For example, assembly 180 of transmission 300 includes a shaft 184, a bearing member 382 disposed rotatably on a shaft 184 that is pivotably coupled to support frame 304 by a mounting arm or idler arm (not shown) and biased so that bearing member 382 pivots to engage chain 129, as previously described. Bearing member 382 may also be called an idler wheel. In FIG. 7, bearing member 382 is a spool that engages a non-tensioned section of chain 129 between transmission bundles 126, 134 (i.e. non-tensioned with regard to the tension that results from transmission bundle 126 delivering torque to transmission bundle 134 via chain 129; not referring to the influence of chain tensioning assembly 180). Without being limited to this or any other theory, the biased engagement between bearing member 382 and chain 129 maintains a desired amount of tension on chain 129 during operations to facilitate both the torque transfer between transmission bundles 126, 134 and the shifting or movement of chain 129 between different aligned pairs of sprockets 128, 138. The cylindrical surface of bearing member 382 is serrated or otherwise roughened to encourage member 382 to rotate as chain 129 travels across it.

For tricycle 210, the transmission components that accomplish the gear ratio selection are assembled together in a common location, which in the example is housing 301, and resulting transmission 300 is longitudinally or radially spaced apart from the front wheels 14, the drive axle, and the rear wheel 16 by radial distances that are greater than the radius of wheels 14, 16. As described for transmission 100, transmission 300 is also spaced apart from a pedal assembly and from a pedal assembly axis, along the length of tricycle 210. In this embodiment, transmission 300 is located entirely in front of rear wheel 16 and pedal assembly 40. In this embodiment, the components that accomplish the gear ratio selection include the sprockets 128, 138, the chain 129, the portions of gear shifting assembly 370 that is disposed in transmission housing 301, including chain tensioning assembly 180. In this embodiment, transmission 300 is also radially spaced apart from pedal assembly 40.

Figure 9:
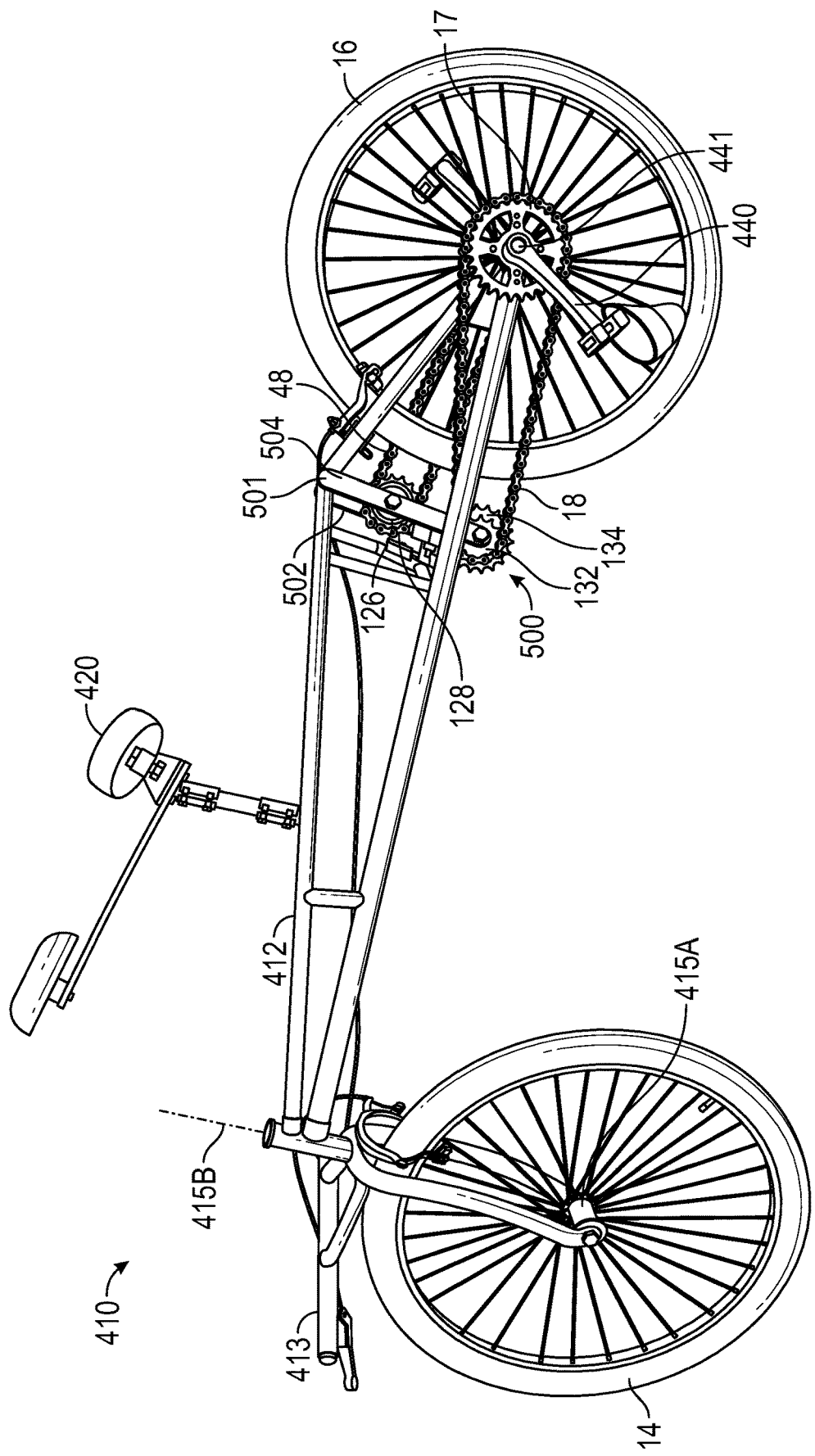
FIG. 9 is a side view of an embodiment of a bicycle in accordance with the principals disclosed herein.

Referring now to FIG. 9, another embodiment of a pedal vehicle and more specifically a prone bicycle 410 is shown. In this embodiment, bicycle 410 includes a transmission 500 installed in a frame 412 extending between a non-driven front wheel 14 and a rear driven wheel 16. Transmission 500 is mounted to frame 412 at a location between wheels 14, 16 and is spaced apart from wheels 14, 16 by radial distances that are greater than the radius of wheels 14, 16. A body support or seat 420 including three spaced apart, upward facing pads is coupled to frame 412 at a location longitudinally between wheels 14, 16. Wheel 14 is rotatably coupled to frame 412 at a front shaft or axle 415A rotatably coupled to frame 412. A pair of handle bars 413 allow for rotation of wheel 14 about a generally vertical axis 415B for steering bicycle 410.

Figure 10:
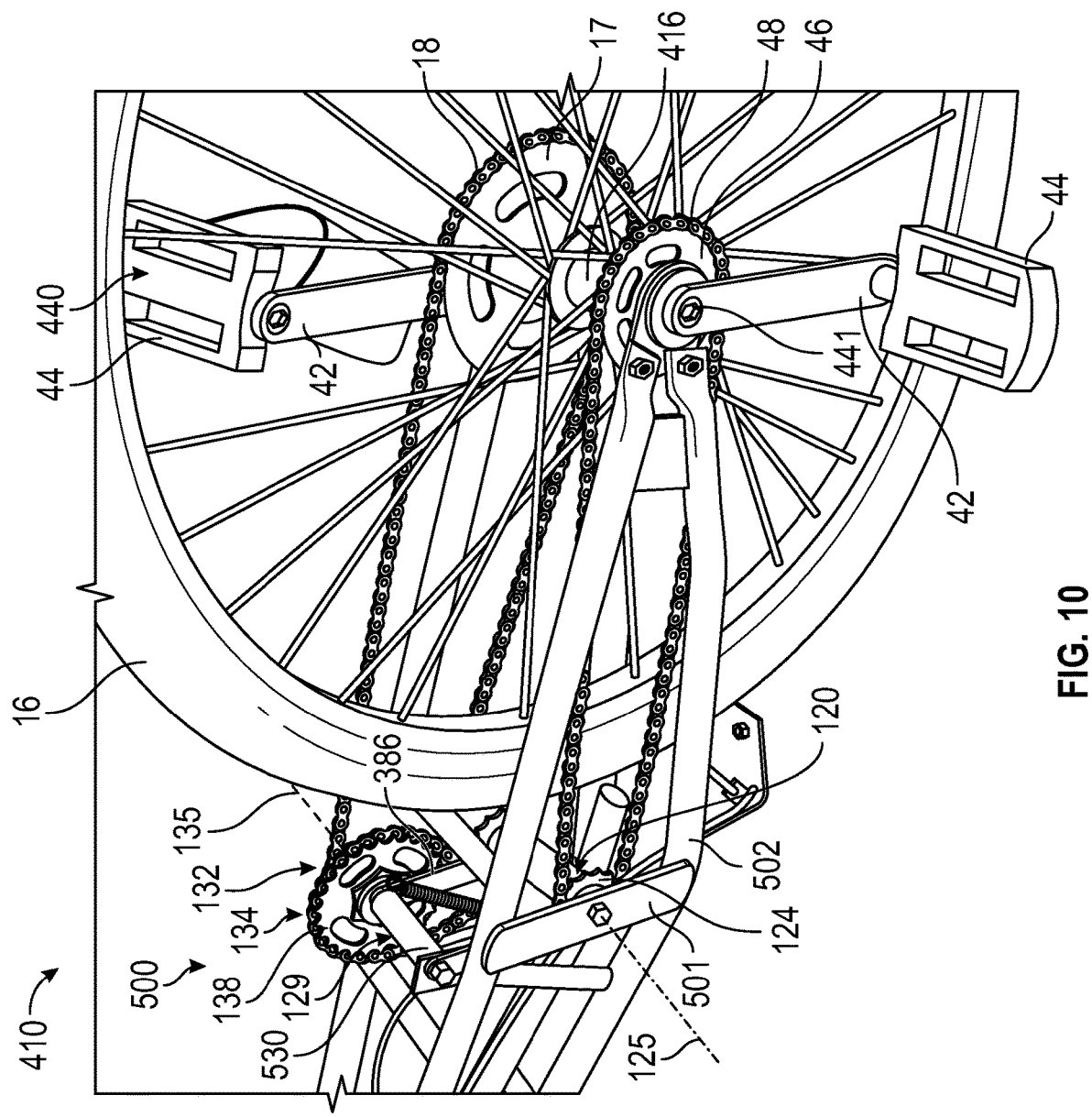
FIGS. 10 and 11 are enlarged partial top and bottom perspective views, respectively, of the rear wheel and transmission of FIG. 9.

Referring now to FIG. 9 and FIG. 10, rear wheel 16 is rotatably coupled to frame 412 with a rear shaft or axle 416. Rear wheel 16 includes a sprocket 17 fixably mounted to drive axle 416 and coupled by a chain 18 to a sprocket or gear within the transmission 500 to transfer torque from transmission 500 to rear wheel 16. In this embodiment, sprocket 17 has 15 teeth. Bicycle 410 further includes a pedal assembly 440 operationally coupled to drive axle 416 and frame 412. Pedal assembly 440 includes a pedal assembly shaft or axle 441 that is co-axially aligned with drive axle 416, and coupled thereto with a bearing (not shown)

that allows axles 416, 441 to rotating relative to each other. Thus, axle 441 of pedal assembly 440 can rotate relative to axle 416 and wheel 16. Pedal assembly 440 also includes a pair pedal arms 42 fixably coupled to axle 441, a pedal 44 at the distal end of each arm 42, and a sprocket 46 fixably coupled to axle 441. Sprocket 46 is coupled to a sprocket or gear within the transmission 500 by a chain 48 to transfer torque from pedals 44 to transmission 500. Pedal assembly 440 is located behind seat 420 and transmission 500. Axle 441 is spaced apart from transmission 500 by a distance greater than the length of pedal arms 42. With the upward facing pads of seat 420 and the placement of pedals 44 at rear wheel 16, bicycle 410 is configured for a rider to ride in a prone position, lying stomach down, face forward with the rider's feet located alongside wheel 16.

Transmission 500 is spaced apart from drive axle 416 and from rear wheel 16 along the length (front-to-back dimension) of bicycle 410. Transmission 500 is also spaced apart from pedal assembly 440, including axle 441, along the length of bicycle 410. In this embodiment, transmission 500 is located entirely in front of rear wheel 16 and pedal assembly 440. Bicycle 410 lacks a rowing assembly, at least in the embodiment shown.

Referring still to FIGS. 9 and 10, transmission 500 includes a housing 501 having a first support frame 502 and a second support frame 504 separated from one another via a plurality shafts or axles and a support strut 150. Housing 501 is integrated with frame 412 and provides support for various other components of transmission 500. Transmission 500 lacks a rotatable shaft 110 that includes a toothed rack, at least in the embodiment shown. Even so, transmission 500 includes some of the same features as transmission 300. For example, transmission 500 includes a rotatable shaft 120 mounted rotatably between support frames 502, 504 along a central axis or rotation 125, parallel to and radially offset from axles 416, axle 441. An input sprocket 124 coupled to shaft 120 to rotate with shaft 120. Shaft 120 and sprocket 124 are operationally coupled to pedal assembly 440 via chain 48. Rotatable shaft 120 also includes a first transmission bundle 126 coupled thereto via a first freewheel assembly (not shown). Shaft 120, gear 122, sprocket 124, chain 48, transmission bundle 126, the first freewheel assembly, and sprockets 128 are structurally and functionally as previously described with respect to transmissions 100, 300.

Figure 11:
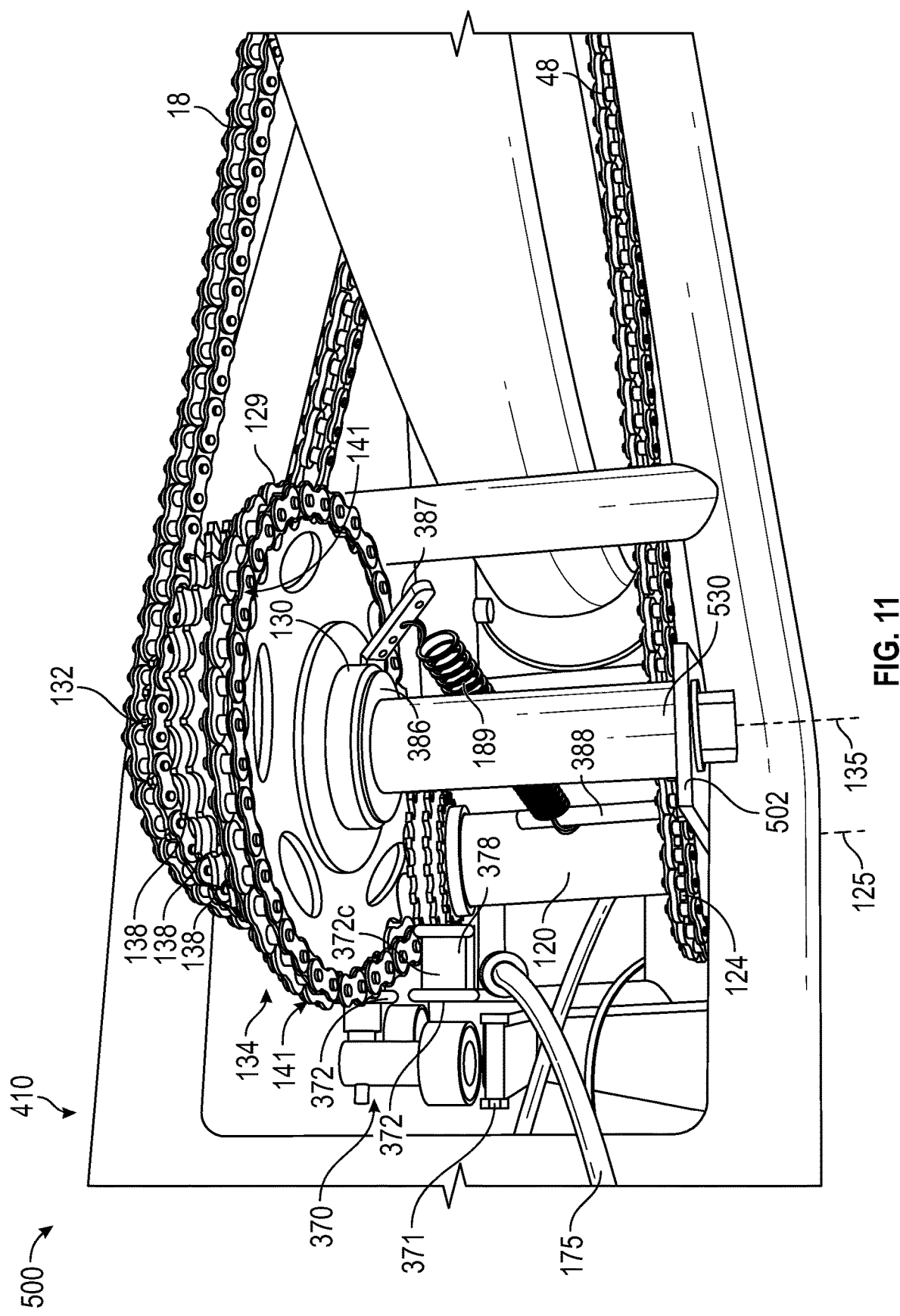

Referring now to FIG. 11, in transmission 500, an axle 530 is configured like axle 330 of transmission 300. In this embodiment, axle 530 is fixably coupled between support frames 502, 504 and extends along a central axis 135, which is parallel to and radially offset from axis 125 and axles 416, 441. A rotatable shaft 130 is rotatably received on axle 530 by a roller bearing (not shown) located radially between axle 530 and shaft 130. As in transmission 300, shaft 130 is configured to rotate relative to the associated housing 501. An output sprocket 132 is mounted to shaft 130 to rotate with shaft 130 and is operationally coupled via chain 18 to extend about drive axle 416 (see FIG. 1A) and sprocket 17 to drive the rotation of rear wheel 16 on axle 16A. Rotatable shaft 130 also includes a second transmission bundle 134 coupled thereto via a second freewheel assembly (not shown). Transmission bundle 134 includes a plurality of sprockets 138 that have a reduced number of teach and diameter moving from first support frame 502 toward second support frame 504 (FIG. 9). Axle 530 (comparable to axle 330), shaft 130, output sprocket 132, transmission bundle 134, the second freewheel assembly, and sprockets 138 are configured and may operate as described above with respect to transmission 300, including potential variations thereof. In transmission 500, first transmission bundle 126 and second transmission bundle 134 are arranged on shafts 120, 130, respectively, and generally axially aligned (along axes 125, 135), as configured for transmission 300, described above. In this embodiment, shaft 130, output sprocket 132, and transmission bundle 134 (including sprockets 138) are configured as an integral or an integrated member. This integral or integrated member may be, for example, formed from a 7-sprocket member on which output sprocket 132 is the smallest sprocket and from which one sprocket is removed between output sprocket 132 and the remaining five sprockets 138.

In this embodiment, the number of teeth for the several gears and sprockets of bicycle 410 are given in Table 2, below. Gear ratios may be calculated from these values.

TABLE 2

Example Gear Configuration for Bicycle 410

| Bicycle 410 | For Pedaling | | | |
|---|---|---|---|---|
| Description of Gear/Sprocket | ref. # | size (# teeth) | ref. # | size (# teeth) |
| pedal sprocket | 46 | 23 | — | — |
| input sprocket | 124 | 13 | — | — |
| transmission bundles sprockets: | 126 | — | 134 | — |
|  | 128 | 17 | 138 | 21 |
|  | 128 | 19 | 138 | 19 |
|  | 128 | 21 | 138 | 17 |
|  | 128 | 23 | 138 | 15 |
|  | 128 | 25 | 138 | 13 |
| output sprocket | — | — | 132 | 25 |
| drive sprocket | — | — | 17 | 15 |

Referring now to FIG. 11, transmission 500 includes a gear shifting assembly 370 configured and operable like the gear shifting assembly 370 of transmission 300 to move chain 129 between dedicated pairs of sprockets 128, 138, which are generally aligned. For example, shifting assembly 370 includes a spring-biased parallel arm mechanism 371 coupled to housing and a pair of space-apart, parallel spools 372 coupled at an end of mechanism 371, and a control cable 175 is coupled to mechanism 371 for a rider to operate to change gears. Spool 372 includes an annular receptacle 378 that includes a cylindrical base surface 372C. Again in this embodiment, spools 372 are located more proximate first transmission bundle 126 than second transmission bundle 134, and spools 372 straddle a tension section of chain 129 (i.e. a section of chain that is under tension during operation, i.e., the tension that results from transmission bundle 126 delivering torque to transmission bundle 134 via chain 129). Chain 129 extends through a region between the facing receptacles 378 of spools 372 and may be located in receptacle(s) 378 (as shown in FIG. 8).

Referring still to FIG. 11, during operation, applying or increasing tension in cable 175 causes mechanism 371 to move spools 372 in a first direction parallel to axes 125, 135. As a result a base surface 372C of one of the spools 372 bears against an external side 141 of chain 129. Relaxing the tension in cable 175 allows spring-loaded mechanism 371 to move spools 372 in the opposite direction, causing the base surface 372C of the other spool 372 to bear against the opposite external side 141 of chain 129. As a result, gear shifting assembly 370 is configured to move chain 129 relative to the several aligned pairs of sprockets 128, 138 in transmission bundles 126, 134, along two opposite directions parallel to axes 125, 135 to change the gear ratio applied between input sprocket 124, 122 on shaft 120 and output sprocket 132 on shaft 130.

Figure 12:
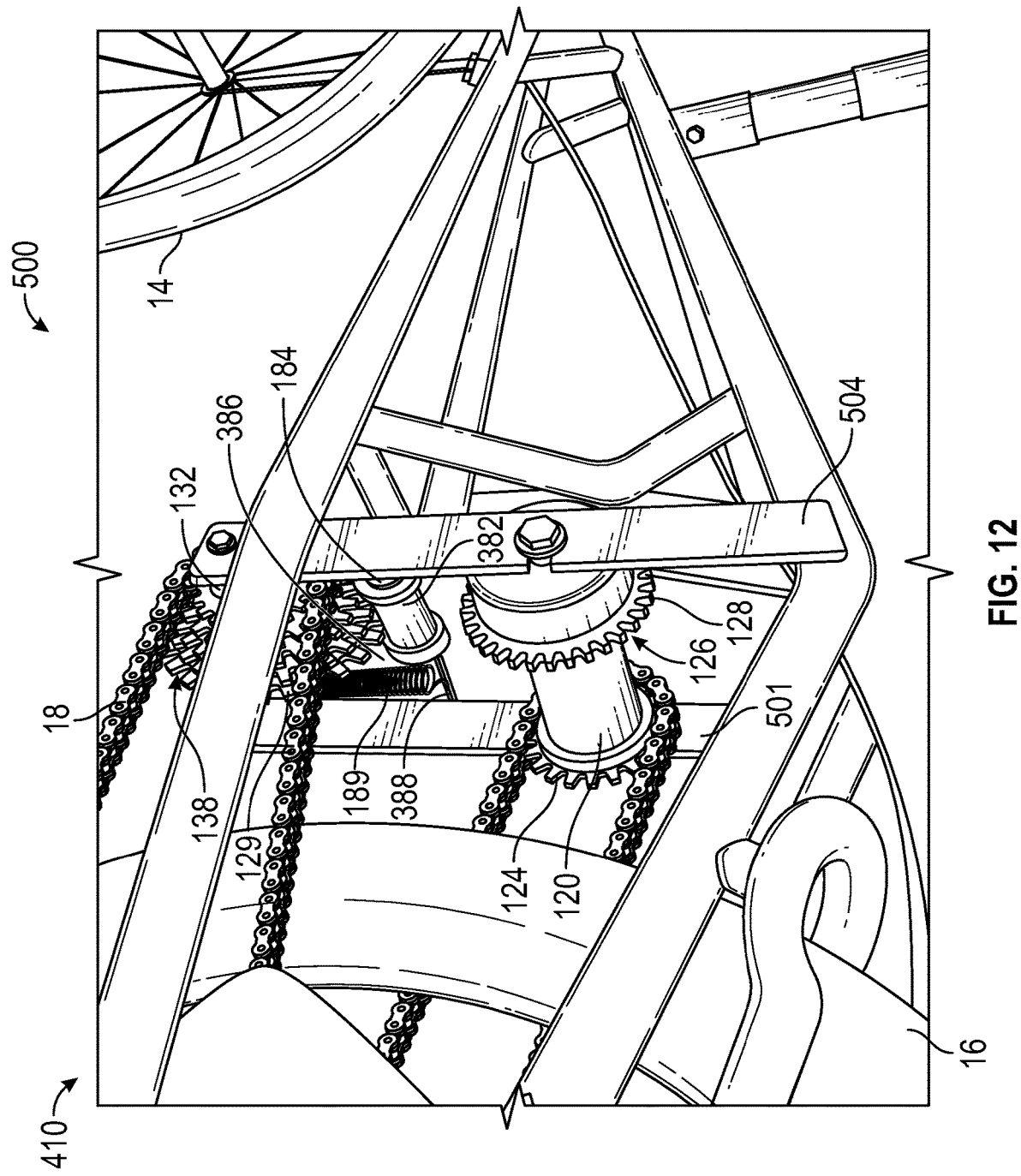
FIG. 12 is an enlarged partial side perspective view (upside down) of the bicycle of FIG. 9.

Referring now to FIGS. 10 and 12, a chain tensioning assembly 180 is disposed on the opposite side of transmission bundles 126, 134 as compared to gear shifting assembly 370. Chain tensioning assembly 180 of transmission 500 is structurally and functionally as previously described with respect to transmission 300. For example, assembly 180 of transmission 500 includes a bearing member 382 disposed on a shaft 184 and rotatably coupled to a mounting arm 386 that is pivotably coupled around axle 530, adjacent transmission bundle 134. Bearing member 382 may also be called an idler wheel, and mounting arm 386 may also be called an idler arm. Referring also to FIG. 11, bearing member 382 is biased by a biasing member 189 (e.g. a spring) so that bearing member 382 pivots to engage non-tensioned section of chain 129 between transmission bundles 126, 134, as previously described with respect to transmission 300. Biasing member 189 couples to an extension arm 387 on mounting arm 386 and a post 388 mounted to housing 501.

For bicycle 410, the transmission components that accomplish the ratio selection are assembled together in a common location, which in the example is housing 501, and resulting transmission 500 is radially spaced apart from the front wheels and from the rear wheels. In this embodiment, the components that accomplish the gear ratio selection include the gears or sprockets 128, 138, the chain 129, the portions of gear shifting assembly 370 that is disposed in or on transmission housing 501, including chain tensioning assembly 180. In this embodiment, transmission 500 is also radially spaced apart from pedal assembly 40.

Figure 13:
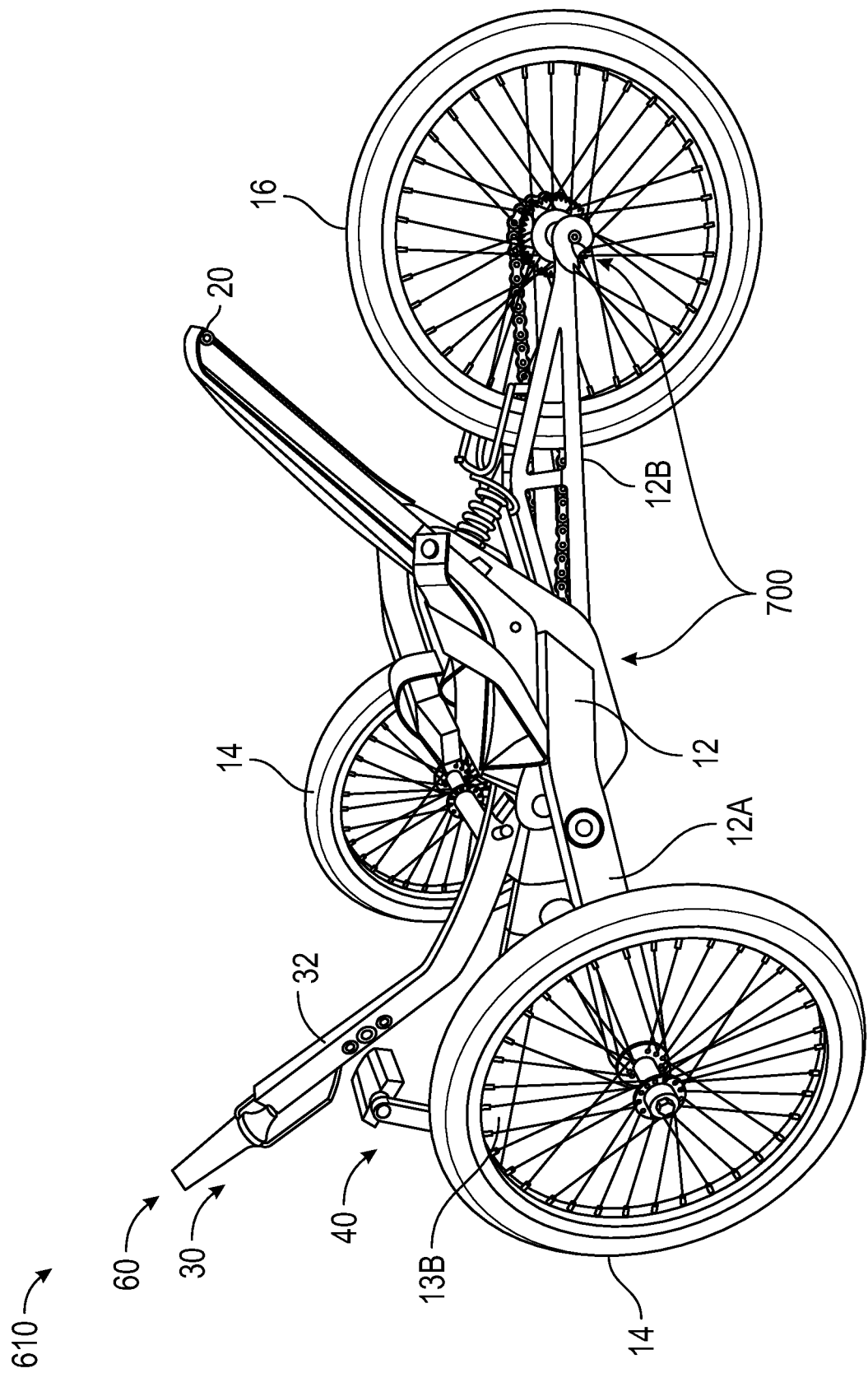
FIG. 13 is a perspective side view of an embodiment of a recumbent combination pedal and rowing tricycle in accordance with the principals disclosed herein.

Referring now to FIG. 13, another embodiment of a pedal vehicle and more specifically a recumbent combination pedal and rowing tricycle 610 is shown. In this embodiment, tricycle 610 includes a transmission 700 installed in a frame 12 with a rowing assembly 30 operationally coupled to frame 12 and transmission 700. Tricycle 610 includes a steering assembly 60 (FIG. 1B). Except for variations related to transmission 700, which will be explained below, tricycle 610 is substantially the same as tricycles 10, 310 previously described. For example, frame 12 of tricycle 610 includes a first or front frame portion 12a extending forward from the mid-region of tricycle 610 and a second or rear frame portion 12b extending rearward from the mid-region of tricycle 610, a pair of non-driven, front wheels 14, rotatably coupled to front frame portion 12a, a rear, drive wheel 16 rotatably coupled to rear frame portion 12b, a seat 20 mounted to frame 12, and pedal assembly 40 operationally coupled to a leg 13B of frame portion 12A, each configured as previously described. Seat 20 includes a seat belt. Horizontally and longitudinally, transmission 700 is located at a mid-region of tricycle 610.

Figure 14:
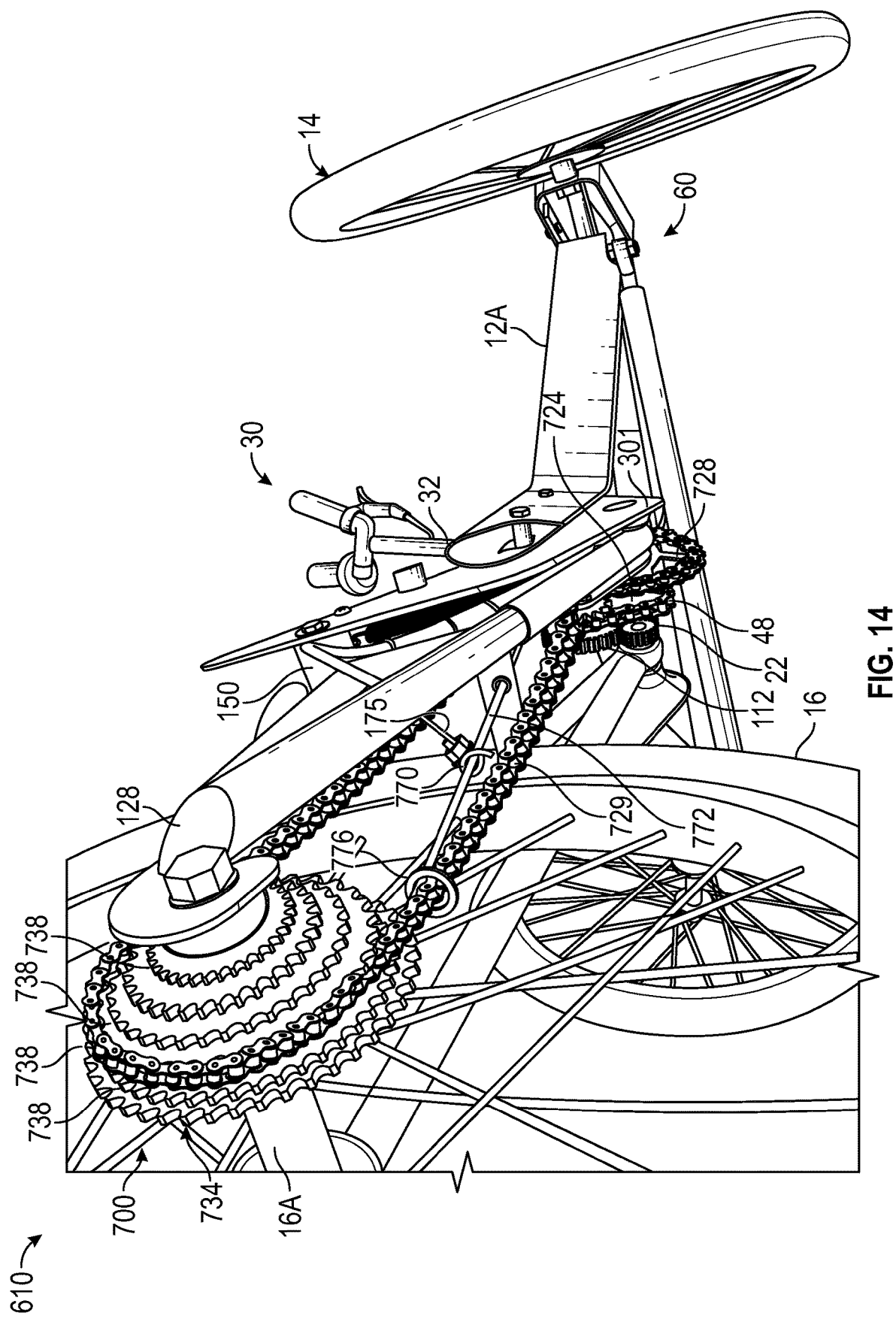
FIGS. 14 and 15 are enlarged perspective bottom and top views, respectively, of the tricycle of FIG. 13.
Figure 15:
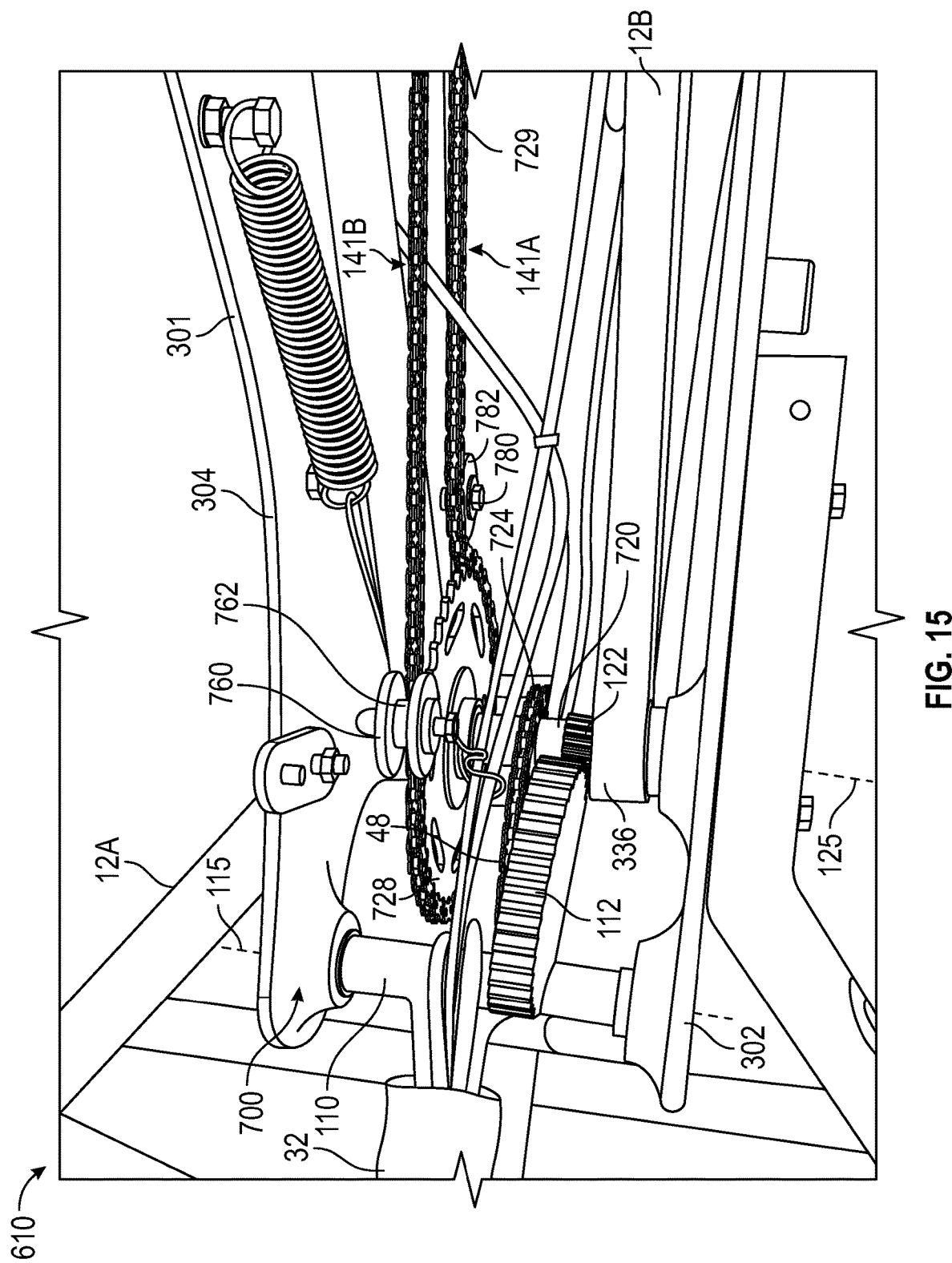

Referring now to FIGS. 14 and 15, transmission 700 includes some of the same features as transmission 300, such as a housing 301 with a first support frame 302 and a second support frame 304 separated from one another via a plurality shafts or axles and a support strut 150. Housing 301 is integrated with frame and supports seat 20 as described above. Likewise, transmission 700 also includes a rotatable shaft 110 mounted rotatably between support frames 302, 304 along a central axis 115 and includes a toothed rack 112 coupled to shaft 110 to rotate with shaft 110. A rowing post 32 of rowing assembly 30 is coupled to shaft 110, configured to reciprocate shaft 110 rotationally about axis 115. Toothed rack 112, shaft 110, and rowing post 32 are structurally and functionally as previously described with respect to transmission 300.

Transmission 700 includes a rotatable shaft 720 rotatably mounted between support frames 302, 304 along a central axis 125. Shaft 720 includes a spur gear 122, an input sprocket 724, and a transfer sprocket 728 coupled to rotate with input sprocket 724. Spur gear 122 is mounted to shaft 720 to rotate with shaft 720 and is meshed or engaged with toothed rack 112 on shaft 110 to receive torque from rowing assembly 30. Input sprocket 724 is coupled to a chain 48 that is operationally coupling with pedal assembly 40. Sprocket 724, 728 are coupled to shaft 720 and to spur gear 122 by an intervening freewheel assembly (not visible) such that gear 122 may rotate the transfer sprocket 728 through shaft 720, but sprockets 724, 728 are unable to rotate gear 122, at least not when pedal assembly 40 is pedaled or rotated in a forward direction. Rear frame portion 12B is coupled with shaft 720 by a pair of pivotable couplings 336 (one is visible). In some embodiments, the coupling of shaft 720, rear frame portion 12B, and housing 301, is configured like the shaft 330 and rear frame portion 12B of tricycle 210, which also includes pivotable couplings 336.

Transmission 700 includes a transmission bundle 734 disposed on drive axle 16A via a freewheel assembly (not shown). Thus, transmission bundle 734 is spaced apart, located behind the remainder of transmission 700 that is in housing 301. Transmission bundle 734 includes a plurality of sprockets 738 that have a reduced number of teach and diameter moving outward on axle 16A. This embodiment includes seven sprockets 738. Sprockets 738 function as output sprockets to drive axle 16A and driving wheel 16. A chain 729 is disposed about transfer sprocket 728 and about the transmission bundle 734, engaging transfer sprocket 728 and a selected one of the sprockets 738. Chain 729 may also be referred to herein as a gear-selection chain or a drive chain. In this embodiment, the number of teeth for the several gears and sprockets of Tricycle 610 are given in Table 3, below. Gear ratios may be calculated from these values.

TABLE 3

Example Gear Configuration for Tricycle 610

| Tricycle 610 | For Pedaling | | For Rowing | |
|---|---|---|---|---|
| Description of Gear/Sprocket | ref. # | size (# teeth) | ref. # | size (# teeth) |
| pedal sprocket | 46 | 23 | | |
| input sprocket | 124 | 13 | | |
| toothed rack | | | 112 | 144* |
| rowing input gear | | | 122 | 13 |
| transfer sprocket | 728 | 42** | Ref. 728 & 734 | |
| transmission bundle sprockets | 734 | — | Same as on the left | |
| | 738 | 13 | | |
| | 738 | 15 | | |
| | 738 | 17 | | |
| | 738 | 19 | | |
| | 738 | 21 | | |
| | 738 | 23 | | |
| | 738 | 25 | | |

*The teeth stated for the toothed rack 112 are for a full 360°, to facilitate consideration of the gear ratio.
**For some embodiments, the number of teeth in transfer sprocket 728 is selected from the range of 36 to 48. Other numbers of teeth are contemplated.

Figure 16:
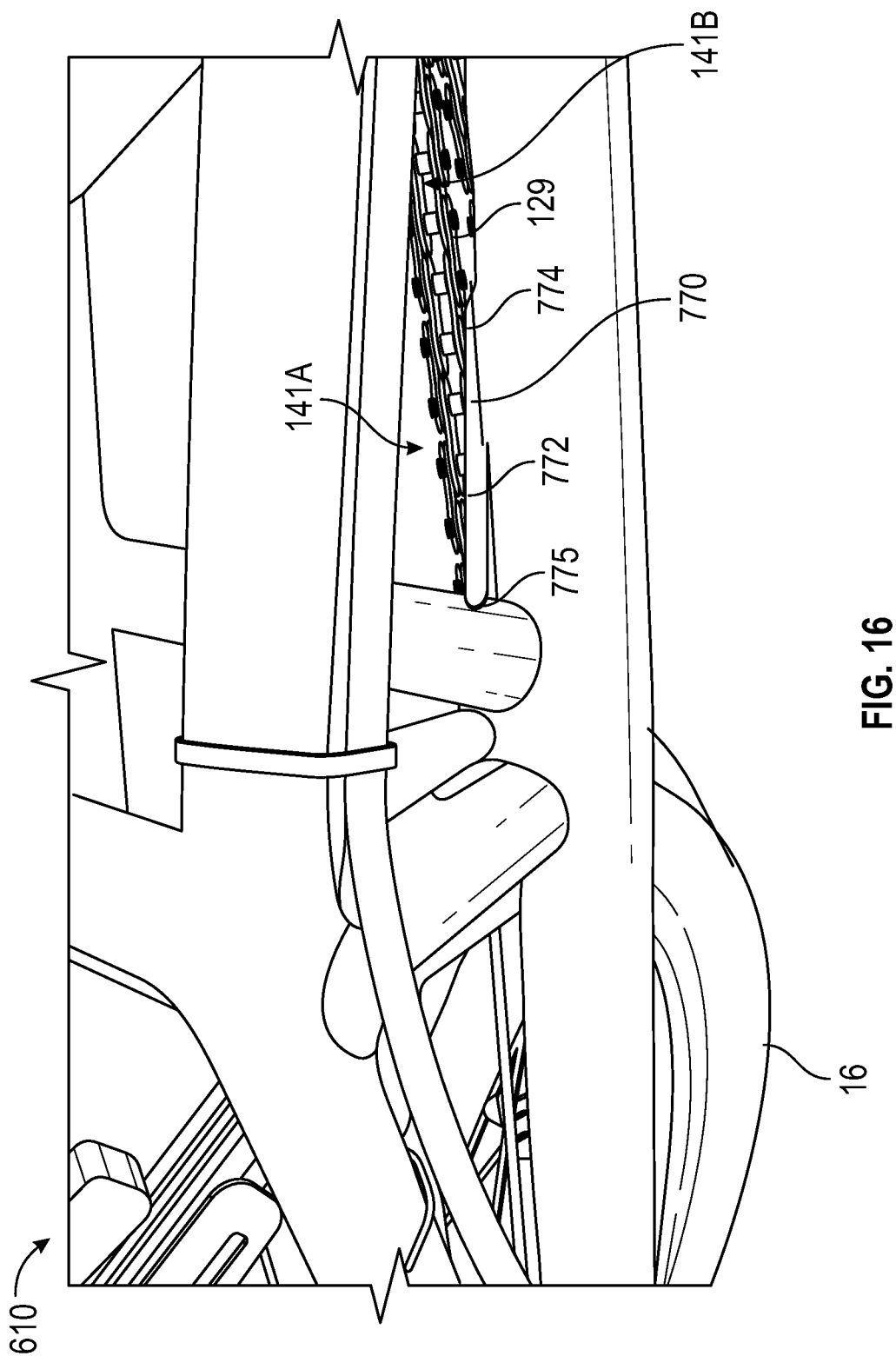
FIG. 16 is an enlarged view of the gear shifting assembly of the tricycle of FIG. 13.

Referring now to FIGS. 14 and 16, transmission 700 includes a gear shifting assembly 770 coupled to rear frame portion 12B behind housing 301. Gear shifting assembly 770 includes a tensioned wire 772 coupled to rear frame portion 12b at an attachment point 774 ahead of rear wheel 16 and extending through a through hole 775 in a lateral cross-member of frame portion 12b with a loose or a clearance fit. In this embodiment, attachment point 774 is formed by a weld but other methods of attachment are possible. Wire 772 extends backwards, alongside wheel 16, towards transmission bundle 734 and includes a loop 776 that wraps around the lower portion of chain 729. Loop 776 is disposed proximal transmission bundle 734 and, in this example, is located a distance of 3 chain links in front of bundle 734. A control cable 175 is coupled to wire 772 forward of loop 776 and coupled to frame portion 12b in a configuration that allows cable 175 to pull wire 772 and loop 776 closer to frame portion 12b so that loop 776 may be positioned in front of any of the sprockets 738. The configuration of wire 772, attachment point 774, and through hole 775 are such that if wire 772 were not coupled to cable 175, wire 772 would extend diagonally toward or into the spokes of wheel 16. Cable 175 pulls or tensions wire 772 rightward with respect to drive axle 16a, to align wire 772 in front or off-center of any sprocket 378, which may be selected by a rider by changing the tension in cable 175 at a gear selector (not shown). Thus, transmission 700 is configured to allow a rider to select between a plurality of gear ratios being selectable by axial movement of chain 729 relative to transmission bundle 734.

During operation of gear shifting assembly 770, additional tension may be applied by cable 175, to apply additional tension to wire 772 and cause loop 772 to move in a first or rightward direction with respect to drive axle 16a. As a result, the inner surface of loop 776 bears against a first or left external side 141A of chain 729, aligning chain 729 with a smaller sprocket 738. Relaxing the tension in cable 175 allows wire 772 to relax, at least partially, and moves loop 776 the opposite direction, causing the inner surface of loop 776 bears against a second or right external side 141B of chain 729, aligning chain 729 with a larger sprocket 738. Wire 772 is an example of an actuator configured to bear against an external surface of a chain to move the chain from one sprocket or pair of sprockets to another sprocket or pair of sprockets.

Referring to FIG. 15, a first bearing member, which in this embodiment is a spool 762 of a chain tensioning or guide assembly 760 is disposed on the upper side of chain 729 proximal transfer sprocket 728. In this embodiment, spool 762 is within one, two, or three links of chain 729 of sprocket 728. A second bearing member, which in this embodiment is a sprocket 782 of a chain tensioning assembly 780 is disposed on the lower side of chain 729. Sprocket is biased toward chain 729 proximal transfer sprocket 728, causing chain 729 to wrap a greater distance around sprocket 728 than it would in the absence of chain tensioning assembly 780.

Transmissions 100, 300, 500, 700 and various other components of tricycles 10, 210, 610 or bicycle 410 may be implemented in other types of vehicles, such as a bicycle, a bicycle-built-for-two, and a quadracycle, as examples. Although described as human-powered, these vehicles or transmissions may be implemented in a vehicle having another power source or having multiple power sources, such as an engine, an electric motor, or an animal, as examples.

In some embodiments, a transmission bundle 126, 134 includes seven sprockets with the following number of teeth: 28, 24, 22, 20, 18, 16, and 14. A transmission bundle 126, 134 may include more or fewer sprockets than the five sprockets or the seven sprockets discussed herein, within a practical engineering limit based on size, space available, and usable gear ratios. Although various embodiments disclosed herein include transmission bundles 126, 134 having the same sizes of sprockets, in some embodiments, one or more of the multiple sprockets of transmission bundle 134 has a number of teeth that differs from all the sprockets of transmission bundle 126. The sizes of the several sprockets and gears described herein, including those listed in Table 1, Table 2, and Table 3, are examples. Other embodiments may use a different number of teeth on a sprocket or sprockets or on a gear or gears.

Although the embodiments herein used sprockets and chains in some locations and gears in other locations, in various other embodiments some or all of these may be implemented by another suitable torque transfer device(s). Some embodiments include a drive wheel 16 located in front of a transmission and non-driven wheels 14 located behind the transmission. Some embodiments include a plurality of drive wheels or a single non-driven wheel. Some embodiments include a seat belt, and the seat belt may aid the rider to exert force on pedals or against a rowing post. Some embodiments includes a transmission 100, 300, 700 but lack a rowing post while including a steering assembly 60 or another steering assembly with one of several conventional handle bars.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A pedal operated vehicle, comprising:
 a frame;
 a plurality of wheels rotatably coupled to the frame, the plurality of wheels including a drive wheel;
 a pedal assembly coupled to the frame and including a pedal and a pedal sprocket configured to be rotated by the pedal; and
 a transmission mounted to the frame, wherein the transmission comprises:
  an input sprocket mounted to a rotatable first shaft;
  an output sprocket mounted to a rotatable second shaft, wherein the output sprocket is configured to drive the rotation of the drive wheel;
  a first plurality of sprockets coupled to the rotatable first shaft;
  a first chain disposed about the pedal sprocket and the input sprocket, wherein the first chain is configured to transfer rotational torque from the pedal sprocket to the input sprocket;
  a second plurality of sprockets coupled to the rotatable second shaft;
  a second chain disposed about one sprocket of the first plurality of sprockets and one sprocket of the second plurality of sprockets;

a rowing assembly including a rowing post that includes a first end proximal the first shaft of the transmission and a second end distal the first shaft of the transmission;
wherein the transmission includes a toothed rack mounted to a rotatable third shaft;
wherein the first end of the rowing post is coupled to the rotatable third shaft to pivot the toothed rack; and
wherein the rotatable first shaft further comprises an input gear engaged with the toothed rack.

2. The vehicle of claim 1, further comprising a chain tensioning assembly including a bearing member biased into engagement with the second chain and configured to maintain tension on the second chain.

3. The vehicle of claim 2, wherein the transmission further comprises a gear shifting assembly, wherein the gear shifting assembly comprises an actuator configured to bear against an external surface of the second chain to move the second chain among dedicated pairs of the first and second plurality of sprockets.

4. The vehicle of claim 3, wherein the actuator comprises a spool including an annular receptacle defined by a first planar side surface, a second planar side surface oriented parallel to the first planar side surface and spaced therefrom, and a cylindrical base surface extending from the first planar side surface to the second planar side surface;
wherein the second chain is disposed in the annular receptacle of the spool and extends at least partially about the cylindrical base surface; and
wherein the spool is configured to move parallel to the rotatable first shaft to allow the first planar side surface to bear against a first side of the second chain.

5. The vehicle of claim 3, wherein the actuator comprises a first spool including an annular receptacle defined by a first planar side surface, a second planar side surface oriented parallel to the first planar side surface and spaced therefrom, and a cylindrical base surface extending from the first planar side surface to the second planar side surface;
wherein the second chain is disposed in the annular receptacle of the first spool, and wherein the first spool is configured to move parallel to the rotatable first shaft to allow the cylindrical base surface to bear against the first side of the second chain.

6. The vehicle of claim 5 wherein the gear shifting assembly further comprises a second spool configured to receive an external second side of the second chain and to extend around inner and outer open faces of the second chain and configured to bear against the second side of the second chain in the opposite direction of the first spool;
wherein first and second spools straddle a tensioned section of the second chain.

7. The vehicle of claim 1, wherein the drive wheel is mounted about a drive axle that is spaced apart radially from the transmission by at least the radius of the drive wheel; and
wherein the drive wheel is coupled to the transmission by a drive chain engaging the output sprocket and extending about the drive axle.

8. The vehicle of claim 7, wherein the pedal is coupled for rotation about a pedal assembly axle by a pedal arm;
wherein the pedal assembly axle is spaced apart from the transmission by a distance greater than a length of the pedal arm.

9. The vehicle of claim 1, wherein the plurality of wheels includes a first non-driven wheel rotatably coupled to the frame and a second non-driven wheel rotatably coupled to the frame and coupled to the first non-driven wheel by a steering linkage;
wherein a handle is coupled to pivot at the distal end of the rowing post;
wherein a cable is coupled to the handle and to the steering linkage, allowing the handle to steer the vehicle when the handle pivots relative to the rowing post; and
wherein the handle is configured to pump the rowing post back and forth to pivot the third shaft.

10. A pedal operated vehicle, comprising:
a frame;
a plurality of wheels rotatably coupled to the frame, the plurality of wheels including a drive wheel;
a pedal assembly coupled to the frame and including a pedal and a pedal sprocket configured to be rotated by the pedal; and
a transmission mounted to the frame, wherein the transmission comprises:
an input sprocket mounted to a rotatable first shaft;
an output sprocket mounted to a rotatable second shaft, wherein the output sprocket is configured to drive the rotation of the drive wheel;
a first plurality of sprockets coupled to the rotatable first shaft;
a first chain disposed about the pedal sprocket and the input sprocket, wherein the first chain is configured to transfer rotational torque from the pedal sprocket to the input sprocket;
a second plurality of sprockets coupled to the rotatable second shaft;
a second chain disposed about one sprocket of the first plurality of sprockets and one sprocket of the second plurality of sprockets;
wherein the plurality of wheels includes a front wheel rotatably coupled at front wheel axle disposed at the front of the frame; and
wherein the pedal assembly is coupled to a front frame member of the frame at a location in front of the front wheel axle.

11. A pedal operated vehicle, comprising:
a frame;
a plurality of wheels rotatably coupled to the frame, the plurality of wheels including a drive wheel;
a pedal assembly coupled to the frame and including a pedal;
a transmission mounted to the frame, wherein the transmission comprises:
a housing;
an input sprocket supported by the housing and mounted for rotation about a first axis, wherein the pedal is configured to drive the rotation of the input sprocket;
a transfer sprocket supported by the housing and mounted for rotation about the first axis, wherein the input sprocket is configured to drive the rotation of the transfer sprocket;
a first plurality of sprockets mounted for rotation about a second axis and configured to transfer rotational torque to the drive wheel;
a chain coupling the transfer sprocket to first plurality of sprockets, wherein the transfer sprocket is configured to drive the rotation of the first plurality of sprockets with the chain; and
a gear shifting assembly comprising an actuator configured to bear against an external surface of the chain to move the chain from one sprocket of the first plurality of sprockets to another sprocket of the first plurality of sprockets;

a rowing assembly including a rowing post having a first end proximal the transmission housing and a second end distal the transmission housing;

wherein the transmission further comprises:
an input gear configured to rotate the transfer sprocket about the first axis;
a toothed rack configured to pivot about a third axis and engaged with the input gear; and
wherein the first end of the rowing post is coupled to the toothed rack to pivot the toothed rack.

12. The vehicle of claim 11, wherein the pedal assembly further includes pedal sprocket configured to rotate about a pedal assembly axle;
wherein the pedal assembly axle is spaced apart from the first axis;
wherein the transmission further includes a pedal chain disposed about the pedal sprocket and the input sprocket; and
wherein the drive wheel is mounted for rotation about a drive axle, wherein the drive axle is radially spaced apart from the first axis.

13. The vehicle of claim 12, wherein the plurality of wheels includes a non-driven wheel mounted to rotate about a non-driven axle radially spaced apart from the drive wheel and the transmission;
wherein the drive axle is radially spaced apart from the transmission.

14. The vehicle of claim 12, wherein the transmission further includes an output sprocket mounted for rotation about the second axis and configured to be rotated by the first plurality of sprockets; and
wherein a drive chain extends between the output sprocket of the transmission and a drive sprocket disposed concentric with the drive wheel and coupled with the drive wheel to rotate the drive wheel.

15. The vehicle of claim 12, wherein the pedal assembly axle is coaxially aligned with the drive axle.

16. The vehicle of claim 11, wherein the second axis and the first plurality of sprockets are spaced from the housing of the transmission;
wherein the drive wheel rotatably disposed about the second axis.

17. The vehicle of claim 11, wherein the transmission further includes:
a second plurality of sprockets including the transfer sprocket, wherein the second plurality of sprockets are mounted for rotation about the first axis; and
wherein the gear shifting assembly is configured to move the chain between a plurality of pairs of sprockets, wherein each pair of sprockets includes one sprocket of the first plurality of sprockets and one sprocket of the second plurality of sprockets.

18. A pedal operated vehicle, comprising:
a frame;
a plurality of wheels rotatably coupled to the frame, the plurality of wheels including a drive wheel;
a pedal assembly coupled to the frame and including a pedal; and
a transmission mounted to the frame, wherein the transmission comprises:
a housing;
an input sprocket supported by the housing and mounted for rotation about a first axis, wherein the pedal is configured to drive the rotation of the input sprocket;
a transfer sprocket supported by the housing and mounted for rotation about the first axis, wherein the input sprocket is configured to drive the rotation of the transfer sprocket;
a first plurality of sprockets mounted for rotation about a second axis and configured to transfer rotational torque to the drive wheel;
a chain coupling the transfer sprocket to first plurality of sprockets, wherein the transfer sprocket is configured to drive the rotation of the first plurality of sprockets with the chain; and
a gear shifting assembly comprising an actuator configured to bear against an external surface of the chain to move the chain from one sprocket of the first plurality of sprockets to another sprocket of the first plurality of sprockets;
wherein the transmission further includes:
a second plurality of sprockets including the transfer sprocket, wherein the second plurality of sprockets are mounted for rotation about the first axis; and
wherein the gear shifting assembly is configured to move the chain between a plurality of pairs of sprockets, wherein each pair of sprockets includes one sprocket of the first plurality of sprockets and one sprocket of the second plurality of sprockets.

* * * * *